March 6, 1928. 1,661,248
C. BARBIERI
DISH FORMING MACHINE
Filed Dec. 10, 1925 10 Sheets-Sheet 1
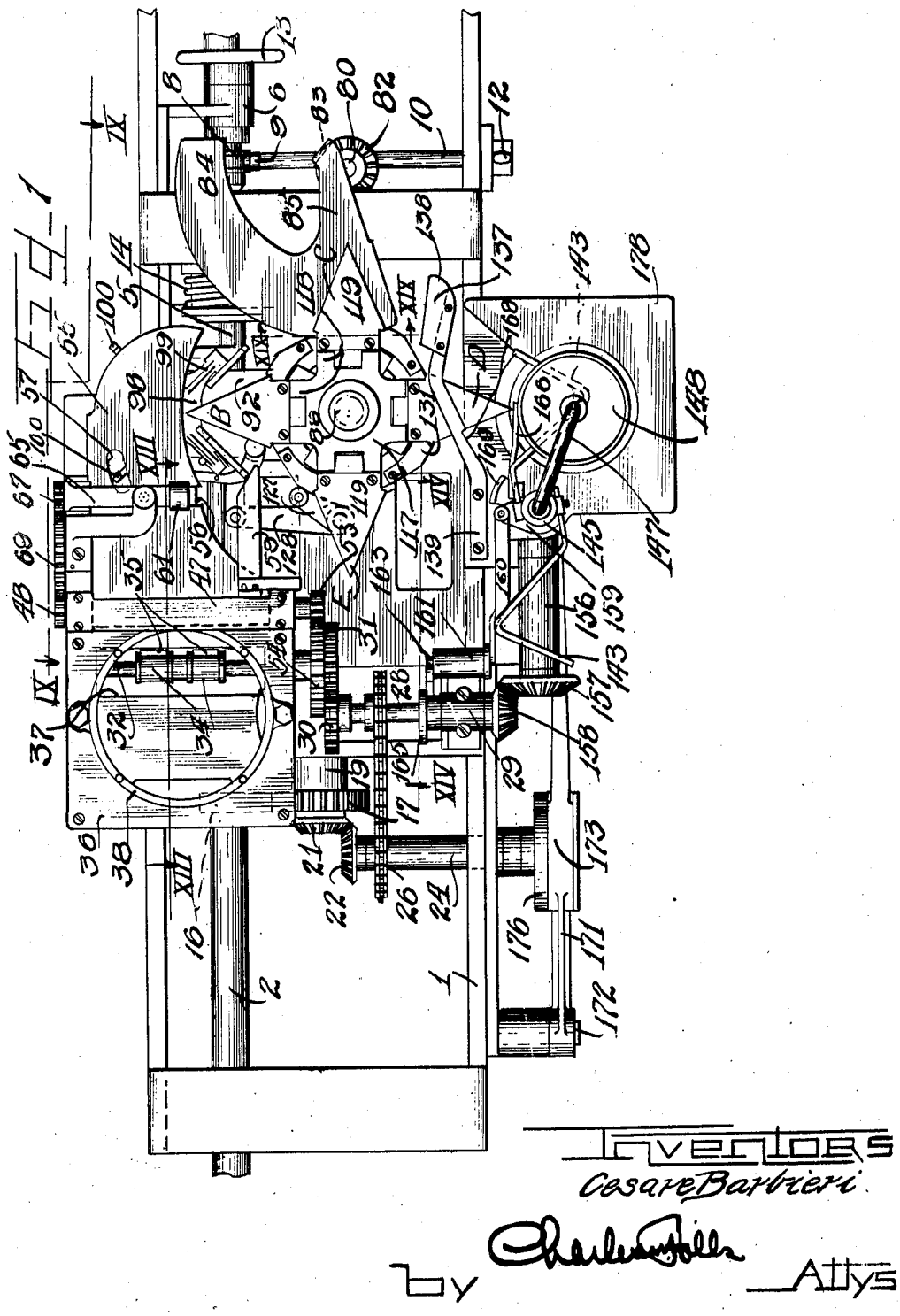
Inventors
Cesare Barbieri
by Charles... Attys

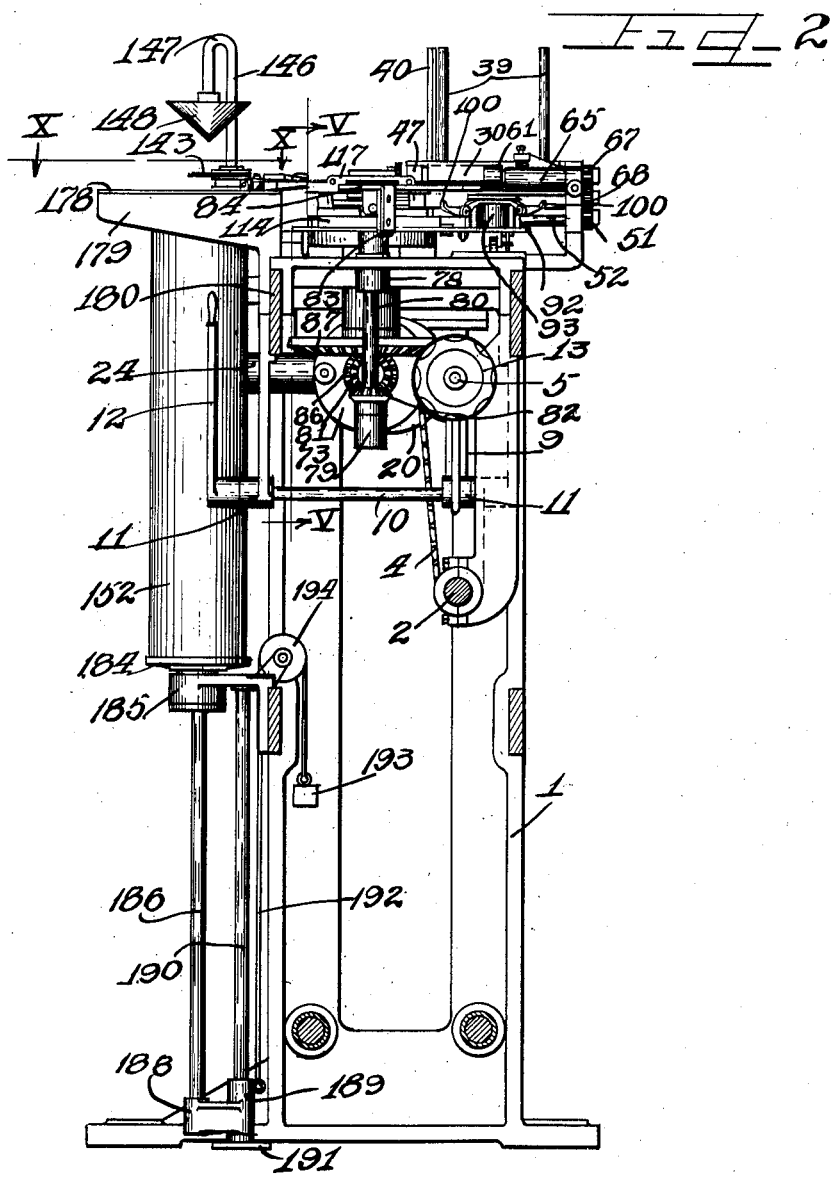

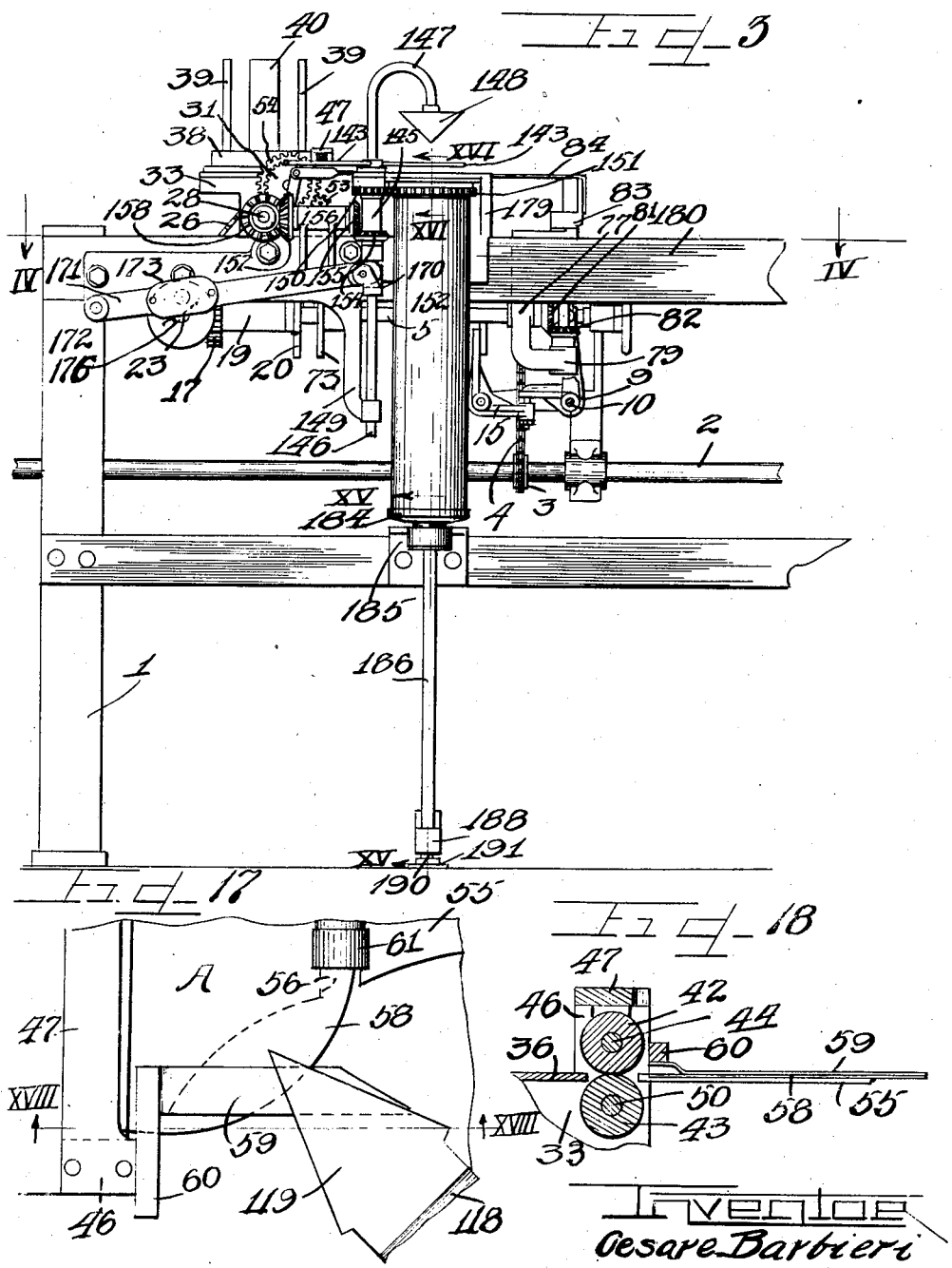

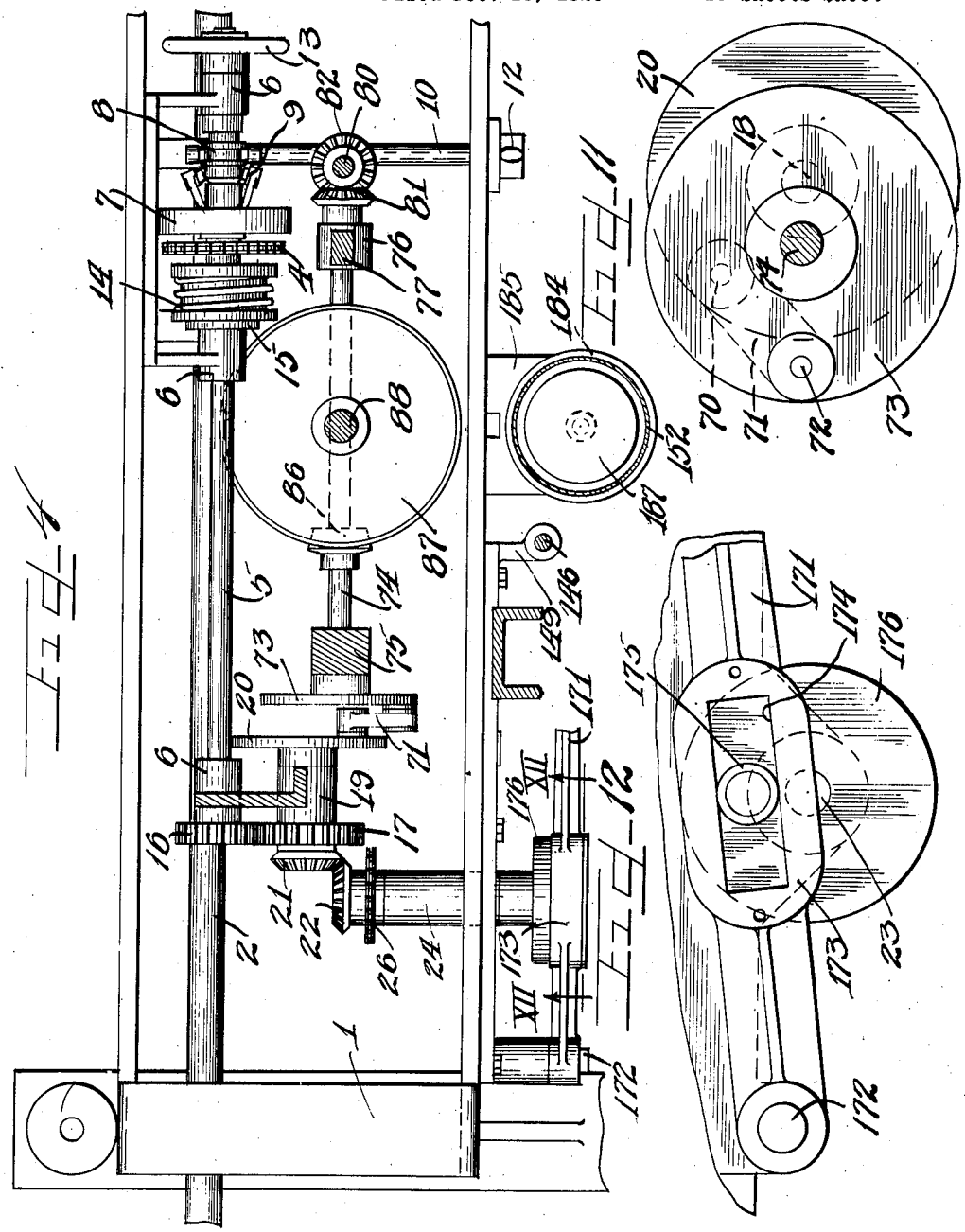

March 6, 1928.　　　　　　　　　　　　　　1,661,248
C. BARBIERI
DISH FORMING MACHINE
Filed Dec. 10, 1925　　　　10 Sheets-Sheet 5
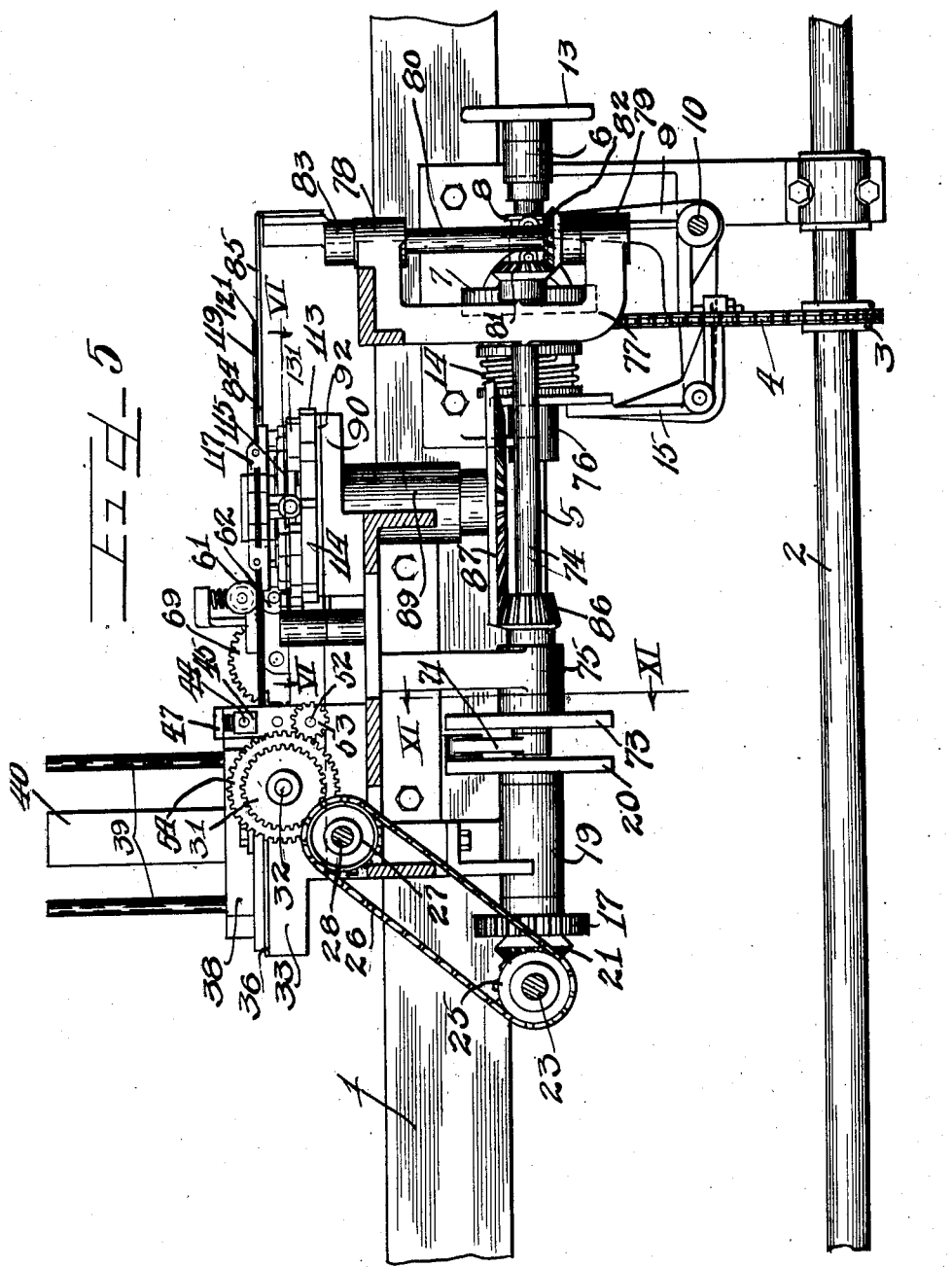
Inventor
Cesare Barbieri
by Charles W. Hills
Attys

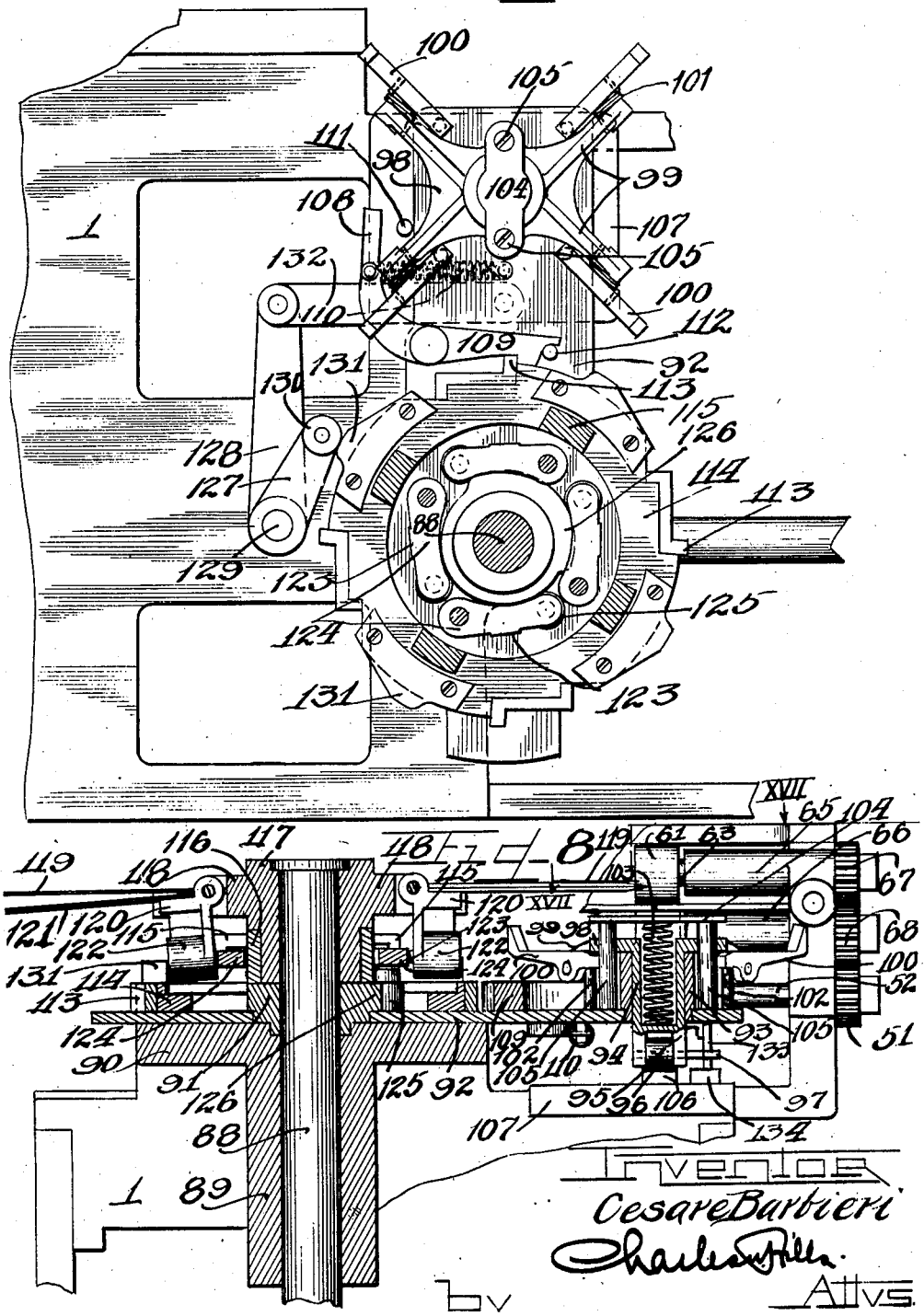

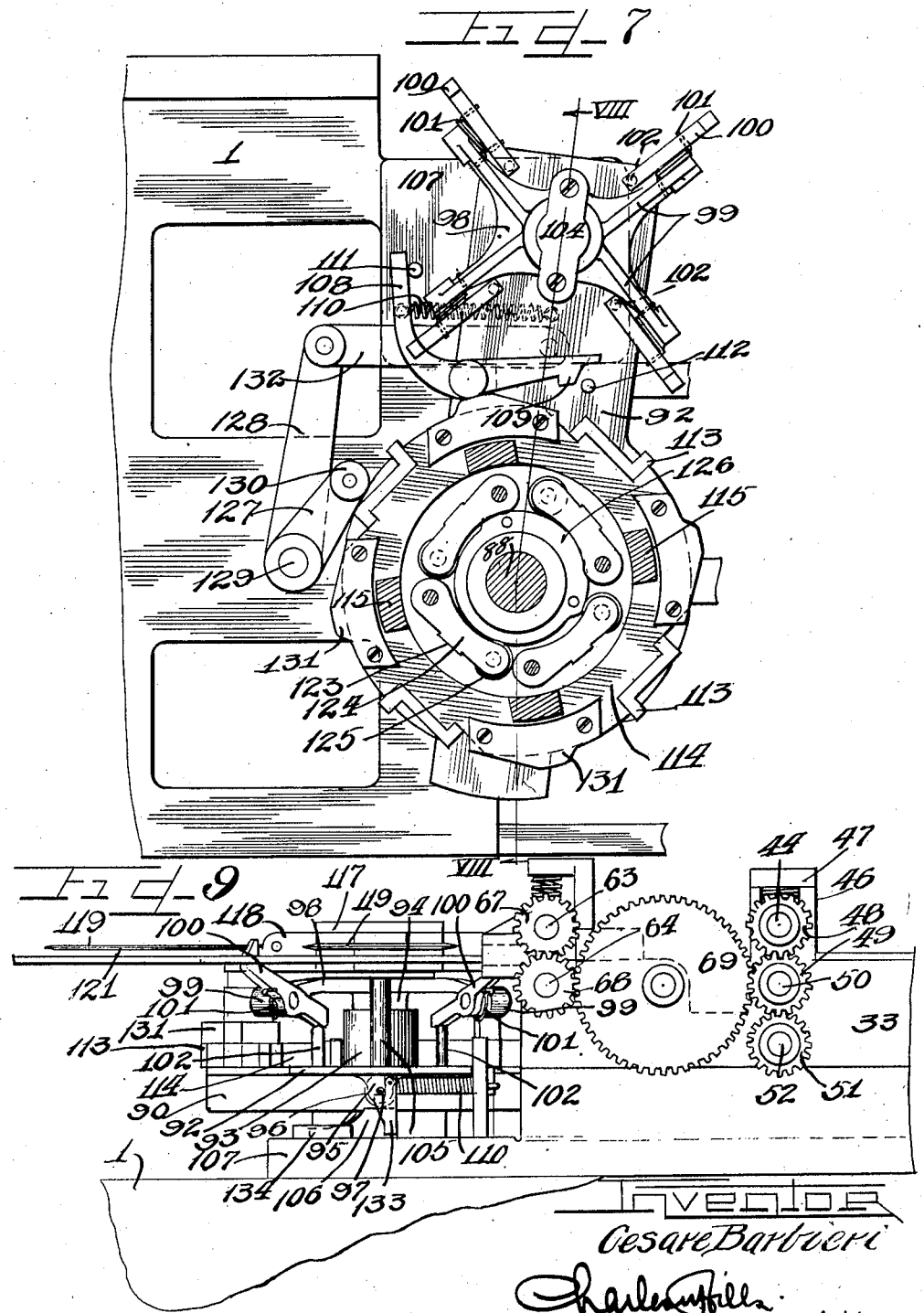

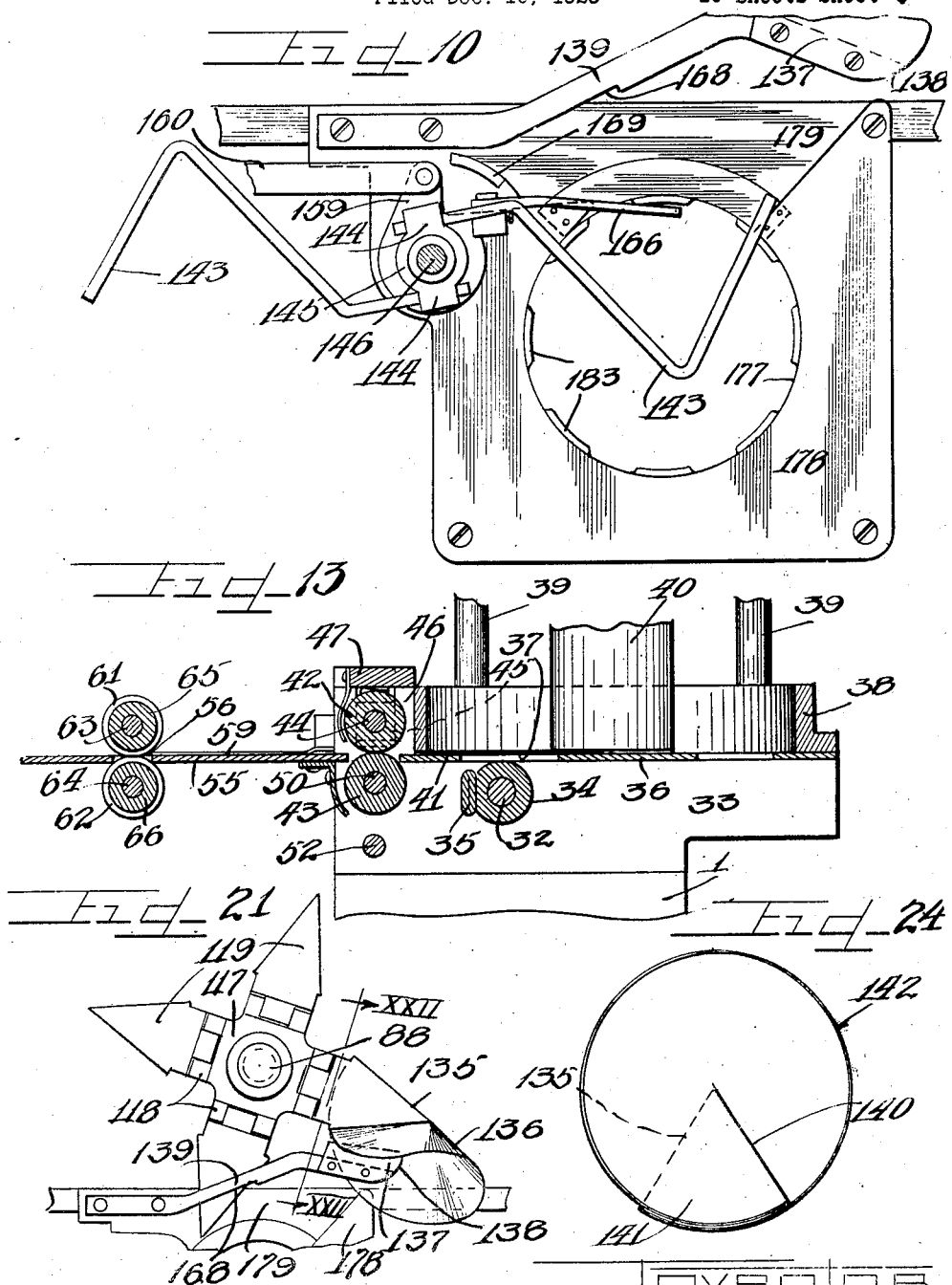

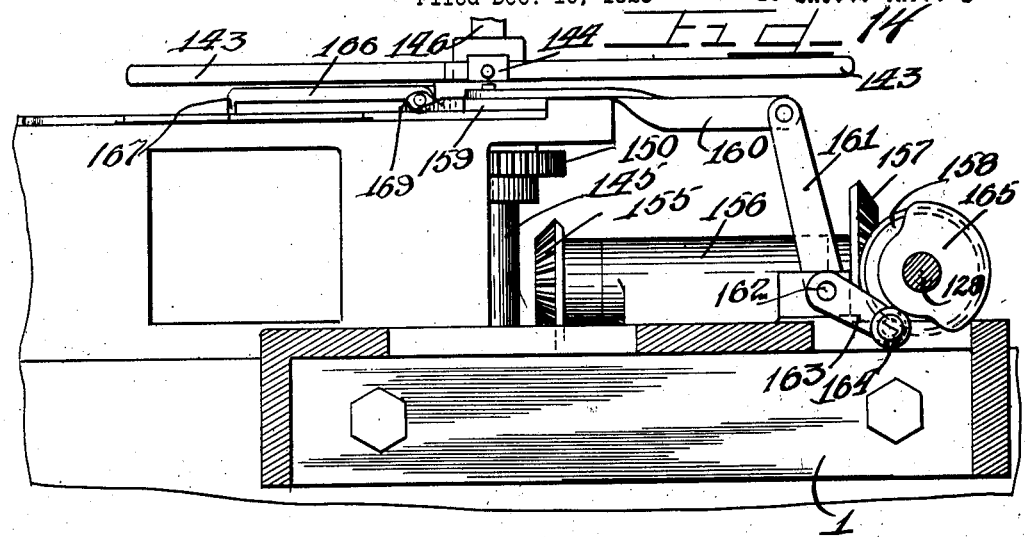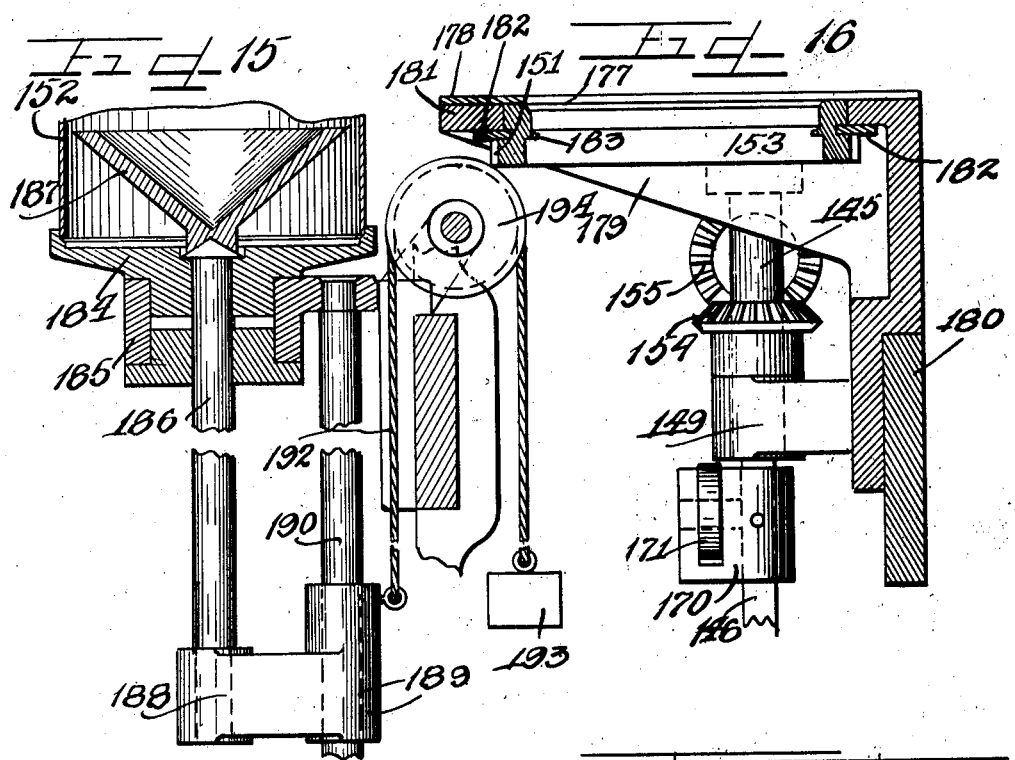

March 6, 1928.
C. BARBIERI
DISH FORMING MACHINE
Filed Dec. 10, 1925
1,661,248
10 Sheets-Sheet 10
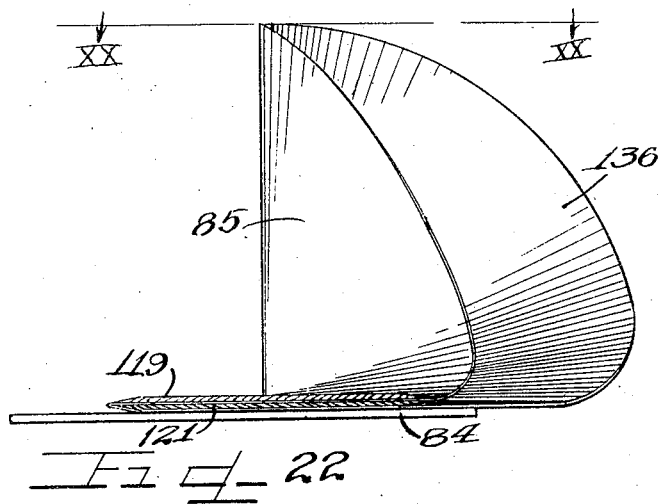
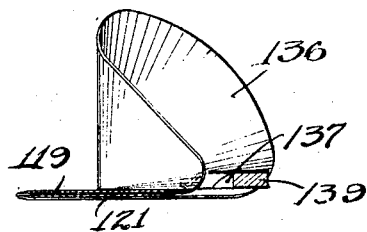
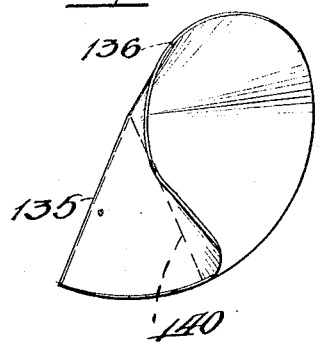
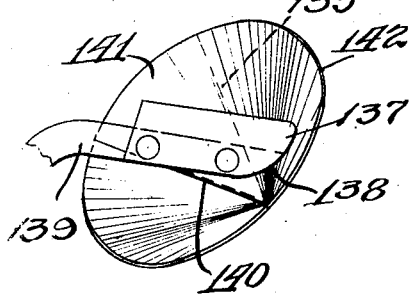
Inventor
Cesare Barbieri
by Charles ... Attys Patented Mar. 6, 1928.

1,661,248

UNITED STATES PATENT OFFICE.

CESARE BARBIERI, OF NEW YORK, N. Y., ASSIGNOR TO THE VORTEX MFG. CO., A CORPORATION OF ILLINOIS.

DISH-FORMING MACHINE.

Application filed December 10, 1925. Serial No. 74,439.

This invention relates to an improved rotary sundae dish forming machine and more particularly to a machine unit which may be independently connected up to receive a drive from a main driving shaft to permit the unit to be independently controlled without interfering with the operation of other units connected to receive a drive from the main driving shaft.

The invention furthermore relates to a sundae dish forming machine wherein blanks are adapted to be automatically fed from a magazine and engaged by automatic centering means to permit a rotatable multiple gripper to grip a centered blank and advance the same into the field of operation of movable and stationary creasing and forming devices which act to automatically shape the blank into a sundae dish which is adapted to be engaged by discharge mechanisms to permit automatic delivery of the finished dish into a dish stacking attachment of the machine.

It is an object of this invention to provide a rapid production sundae dish forming machine wherein the rotary gripping device is adapted to simultaneously carry a number of blanks in consecutive order through the field of operation of creasing and forming mechanisms to produce finished sundae dishes which when formed are adapted to be automatically counted and stacked.

It is also an object of this invention to provide a receptacle forming machine wherein blanks advancing into the machine are adapted to be automatically centered and then gripped by a rotatable gripping means which serves to carry the blank through a circular path into the field of operation of a rapidly moving rotatable cam creasing device and then into the field of operation of a stationary creasing and forming device which completes the forming of the receptacle as a rotatable discharge mechanism moves the formed receptacle into a position to be engaged by a reciprocating plunger which acts to automatically deliver the formed receptacle into a receiving tube in which the formed dishes are automatically stacked in nested relation with the folded portions of adjacent dishes staggered with respect to one another to permit the dishes to be stacked in a straight column within the stacking tube.

It is a further object of this invention to provide a sundae dish forming machine having a rotatable mechanism provided with a plurality of radially directed grippers adapted to carry blanks in rapid succession through the field of operation of a rapidly rotating cam blade which acts to initially crease and fold a blank after which the partly formed blank is carried into a position to be acted upon by a stationary creasing and forming device which finishes the creasing and forming of the blank to form a sundae dish therefrom for automatic delivery into an automatic stacking device.

It is furthermore an object of this invention to provide a sundae dish forming machine having a rotatable multiple blank carrying gripper for successively carrying centered blanks through the field of operation of a rotatable creaser and former which rotates at a higher rate of speed than the multiple gripper to cause the blanks to be partially creased and formed before being carried into the field of operation of a stationary creaser and former which acts to complete the shaping of the dishes as said dishes are automatically discharged and delivered into a dish stacking attachment operable from the machine.

It is an important object of this invention to provide an improved rotary sundae dish forming machine adapted to rapidly produce sundae dishes from substantially circular blanks which are automatically delivered from a blank holding magazine into the field of operation of multiple centering mechanisms which act automatically to center the dish blanks to permit the same to be gripped by a rotatable multiple gripper device which acts to successively carry the centered blanks through the field of operation of rotatable and stationary creasing and forming mechanisms to automatically shape the blanks into sundae dishes which are automatically discharged from the rotatable gripper device, counted, and then automatically delivered into a receiving tube in which the finished dishes are stacked with the folded portions thereof offset with respect to one another to form a straight column of dishes adapted to be easily handled when removed from the receiving tube.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view of an improved rotary sundae dish forming machine unit embodying the principles of this invention, and having mechanisms permitting the unit to be independently connected with or disconnected from a main driving shaft with which other similar units may be independently connected.

Figure 2 is an end elevation of the improved machine with parts of the framework shown in section.

Figure 3 is a reduced front elevation of the machine.

Figure 4 is an enlarged horizontal section taken on line IV—IV of Figure 3.

Figure 5 is a fragmentary vertical section taken on line V—V of Figure 2.

Figure 6 is an enlarged fragmentary horizontal sectional view taken on line VI—VI of Figure 5, and illustrating the blank centering mechanisms in their normal positions.

Figure 7 is a view similar to that illustrated in Figure 6 showing another position of the blank centering mechanisms.

Figure 8 is a fragmentary vertical section taken on line VIII—VIII of Figure 7 with parts shown in elevation.

Figure 9 is a fragmentary rear elevation of the machine taken on line IX—IX of Figure 1.

Figure 10 is an enlarged horizontal detail view of the dish discharge and stacking attachment taken on line X—X of Figure 2.

Figure 11 is an enlarged detail view of the eccentric driving disks taken on line XI—XI of Figure 5.

Figure 12 is an enlarged fragmentary detail view taken on line XII—XII of Figure 4 illustrating the mechanism for operating the plunger mechanism of the stacking attachment.

Figure 13 is a fragmentary vertical section of the blank feeding magazine taken on line XIII—XIII of Figure 1.

Figure 14 is an enlarged fragmentary vertical detail section taken on line XIV—XIV of Figure 1.

Figure 15 is an enlarged fragmentary vertical detail section of the lower portion of the stacking tube taken on line XV—XV of Figure 3.

Figure 16 is an enlarged fragmentary vertical section of the upper portion of the dish stacking tube taken on line XVI—XVI of Figure 3.

Figure 17 is a fragmentary plan view taken on line XVII—XVII of Figure 8 and illustrating a portion of a dish blank as it is being delivered from the blank holding magazine.

Figure 18 is an enlarged fragmentary detail vertical section taken on line XVIII—XVIII of Figure 17.

Figure 19 is an enlarged fragmentary detail section taken on line XIX—XIX of Figure 1 and illustrating a dish blank in its first stage of being formed.

Figure 20 is a reduced top plan view of the partially formed dish taken on line XX—XX of Figure 19.

Figure 21 is a top plan view of the rotary gripper mechanism in a position ready to carry a partially formed blank into the field of operation of the stationary creaser and former.

Figure 22 is a fragmentary detail section taken on line XXII—XXII of Figure 21.

Figure 23 is a top plan view of the substantially completed dish associated with the stationary creaser and former.

Figure 24 is a top plan view of a completely formed sundae dish.

As shown on the drawings:

The improved machine is of the multiple type made up of a plurality of units, each adapted to be independently connected with a common driving source so that any one or more of the units may be independently disconnected from the driving source without necessitating the stopping of all of the units comprising the entire machine lineup. Only one of the units is illustrated and will be described coacting with the common driving source.

The reference numeral 1 indicates a machine framework having supported thereon in suitable bearings a main driving or power shaft 2 adapted to be connected to receive a drive from any suitable source of power. Mounted on the driving shaft 2 is a sprocket 3 around which an endless chain 4 is trained. The chain 4 is also trained around a sprocket mounted upon an auxiliary driving shaft 5 which is journalled in suitable bearings 6 on the machine frame. Mounted on the auxiliary shaft 5 is a fly-wheel 7 with which a clutch mechanism 8 is positioned to co-act. The clutch mechanism 8 is adapted to be operated by means of a bell crank 9 mounted on a transverse shaft 10 journalled in suitable bearings 11 on one end of the machine frame. Mounted on the outer projecting end of the transverse shaft 10 is a starting lever 12 to permit operation of the bell crank 9 to cause operation of the clutch 8. Also mounted on the outer end of the auxiliary shaft 5 is a hand wheel 13 for manually operating the auxiliary shaft 5 when necessary. Mounted on the auxiliary shaft 5 adjacent the inner side of the driving chain 4 is an automatic throw-out or release mechanism 14 adapted to act automatically to stop the machine when the same becomes jammed or when some other abnormal operation takes place. The automatic throw-out 14 is adapted to operate a bell crank 15 which in turn is positioned to coact with the bell crank 9 to cause operation of the clutch 8.

Mounted on one end of the auxiliary shaft 5 is a gear 16 which is in mesh with a gear 17 mounted on a stub shaft 18 journalled within a bearing sleeve 19 supported on a suitable bracket secured to the machine frame. Mounted on one end of the stub shaft 18 is an eccentric disk 20 for a purpose hereinafter more fully described. Mounted on the other end of the stub shaft 18 is a beveled gear 21 which meshes with and drives a beveled gear 22. The beveled gear 22 is mounted on the inner end of a transverse stub shaft 23 journalled in a suitable bearing 24 supported on the machine frame. Mounted on the transverse shaft 23 adjacent the beveled gear 22 is a sprocket 25 around which an endless chain 26 is trained. The chain 26 passes upwardly and is trained around a sprocket 27 which is supported on a transverse stub shaft 28 journalled in a suitable bearing 29 on the machine frame. Mounted on the rear or inner end of the transverse stub shaft 28 is a gear 30 adapted to impart a drive to the blank feeding mechanisms forming a part of the machine.

Meshing with the gear 30 is a larger gear 31 which is mounted on one projecting end of a blank feed shaft 32. The shaft 32 is journalled transversely of the machine in a housing or box 33 supported on the machine frame. Mounted on the blank feed shaft 32 are a pair of blank feed reels or rollers 34 which carry blank feed friction pads 35 made of rubber or other suitable material. The friction pads 35 extend around a portion of the feed reels only so as to engage a dish blank only at a predetermined time in each revolution of the feed reels. Mounted on the box or casing 33 is a plate or table 36 having a transverse slot or opening 37 therein through which the friction pads are adapted to be projected into frictional engagement with the lowermost dish blank in a dish blank carrying magazine 38 which is mounted upon the table 36. A plurality of blank guide posts 39 are positioned upon the magazine ring 38 for the purpose of holding a stack of dish blanks. Also mounted on the magazine is an upright guide or centering bar 40 against which the segment edges of the dish blanks are adapted to engage so that the dish blanks will be fed downwardly through the magazine in a proper position for feeding into the machine. A slot 41 (Figure 13) is provided in the magazine ring 38 to permit the lowermost blank to be discharged out of one side of the lower portion of the magazine. Rotatably mounted on the outside of the magazine 38 adjacent the outlet slot 41 is a pair of blank feed rollers 42 and 43 which act to receive the blanks which are fed out of the magazine by means of the friction pads 35 on the reels 34. The upper feed roller 42 is supported on an upper shaft 44, the ends of which are journalled in bearing blocks 45 which are spring controlled to permit adjustment of the upper roller 42 with respect to the lower roller 43. The bearing blocks 45 are slidably mounted in recesses provided in a pair of upright brackets or arms 46 formed on the side of the casing or box 33 that supports the magazine 38. A top bar 47 connects the upper ends of the brackets or arms 46. Engaged on the outer end of the top roller shaft 44 is a pinion 48 which meshes with and receives a drive from a pinion 49 mounted on the outer end of a lower roller shaft 50 which supports the lower feed roller 43. Meshing with and driving the lower pinion 49 is a drive pinion 51 which is mounted on one end of a transverse shaft 52 journalled in suitable bearings in the magazine supporting casing or box 33. Mounted on the front end of the lower shaft 52 is a gear 53 which is in mesh with a large gear 54 mounted on the blank feed shaft 32 adjacent the inner side of the gear 31. It will thus be seen that the blank feed rollers 42 and 43 as well as the blank feed reels 34 are adapted receive a drive from the driving chain 26 through the respective gear mechanisms.

A dish blank 58 (Figure 17), which has been fed out of the magazine by means of the friction pads 35 and the primary feed rollers 42 and 43 is delivered upon a stationary table 55 supported on the machine frame and having a transverse slot 56 and an arcuate slot 57 therein. Before leaving the primary feed rollers 42 and 43 the blank 58 is advanced over the table 55 beneath a guide blade 59 secured to a transverse bar 60 fastened to one of the upright arms or brackets 46. The blank 58 is thus advanced over the table 55 until the same passes between a pair of secondary feed rollers 61 and 62 mounted on upper and lower shafts 63 and 64 respectively. The shaft 63 of the upper secondary feed rollers 61 is journalled in a bearing sleeve 65 mounted on the machine frame. The lower secondary feed roller shaft 64 is journalled in a bearing 66 mounted on the machine frame. The lower secondary feed roller 62 is positioned below the table 55 and projects through the transverse slot 56 to contact the peripheral surface of the upper secondary feed roller 61 (Figure 13). Mounted at one end of the upper secondary feed roller shaft 63 is a pinion 67 which meshes with a pinion 68 mounted on one end of the lower secondary feed roller shaft 64. The lower pinion 68 receives a drive from a large gear 69 with which it meshes. The large gear 69 is rotatably mounted on the rear side of the machine frame (Figure 9) and is in mesh with the gear 49 to receive a drive therefrom. The primary feed rollers 42 and 43 thus advance the dish blank 58 over the table 55 below the guide blade 59 and between the secondary feed rollers 61 and 62 into the position A illustrated in Figure 17 ready to pass between a pair of gripper plates prior to the further advancement of the dish blank by the secondary feed rollers 61 and 62 over the outer end portion of the table 55 into a blank centering position.

Before starting the creasing and forming operations of a dish blank 58, said dish blank is first properly centered by an automatic blank centering mechanism operable from the machine. The centering operation takes place before the advancing blank is gripped by a gripping mechanism hereinafter described.

Pivotally engaged on an eccentric pin 70 on the disk 20 is one end of a connecting rod or link 71, the other end of which is pivotally engaged on an eccentric pin 72 secured upon the face of a second disk 73 positioned adjacent and parallel to the disk 20. The two disks 20 and 73 are separated by the eccentric connecting rod 71 as clearly illustrated in Figures 5 and 11. The disk 73 is mounted on one end of a shaft 74 which is journalled in a suitable bearing bracket 75 and in a bearing sleeve 76. The bearing bracket 75 is supported on the machine frame while the bearing sleeve 76 is formed on a U-shaped bracket 77 supported on the machine frame and carrying bearing sleeves 78 and 79 in which a vertical shaft 80 is journalled. Mounted on the end of the shaft 74 to the outside of the bearing sleeve 76 is a beveled gear 81 which meshes with a beveled gear 82 mounted on the vertical shaft 80. The vertical shaft 80 is thus adapted to be rotated from the shaft 74 to cause rapid rotation of a bracket 83 secured on the upper projecting end of the vertical shaft 80. Secured to the bracket 83 is a downwardly directed arm or lug of a horizontally disposed rotatable creasing and forming cam blade 84 which is clearly illustrated in Figure 1 and comprises an arc shaped blade, one end of which is provided with an integral, radial arm 85 secured to the bracket 83.

Also secured on the horizontal shaft 74 adjacent one side of the bearing sleeve 75 (Figure 5) is a beveled pinion 86 which is meshed with a large beveled gear 87 supported on the lower end of the vertical shaft 88. The vertical shaft 88 is journalled in a bearing sleeve 89 formed on the machine framework. Integrally formed on the upper end of the bearing sleeve 89 is a supporting plate 90 recessed to receive a stationary collar 91 (Figure 8). Pivotally engaged around the collar 91 is one end of a blank centering table 92. The automatic blank centering mechanisms are supported on the outer end portion of the pivoted centering table 92 and comprise (Figure 8) an upright sleeve 93, the lower end of which projects into an aperture in said table 92 and is rigidly riveted or otherwise secured thereto. Slidably engaged in the sleeve 93 is a cylindrical inner sleeve or hollow plunger 94 the lower end of which is closed and has integrally formed thereon a pair of apertured fingers or lugs 95 between which a roller 96 is rotatably mounted on a stub shaft or pin 97. The upper projecting end of the hollow plunger 94 is provided with a peripheral flange or spider 98 having a plurality of radially directed arms 99. Fulcrumed on the end of each of the spider arms 99 is a blank centering finger or dog 100 controlled by a spring 101 (Figure 9) which normally acts to hold the outer tip end of each centering dog 100 in its raised position while the inner end is resiliently held in contact with the upper end of a pin or post 102 supported in an upright position upon the centering table 92. For the purpose of normally holding the spider 98 in its lowered position as illustrated in Figure 8 a coiled control spring 103 is seated within the plunger 94 with the upper end of said spring engaged beneath a bridge plate 104 the ends of which are rigidly secured to the top ends of a pair of posts 105 secured upon the upper surface of the centering table 92. As illustrated in Figure 1, one of the blank centering dogs 100 is adapted to be projected upwardly through the arcuate slot 57 of the blank centering table 55 while the other three blank centering dogs 100 project upwardly beyond the limits of the end of said table 55 when the dogs 100 are in their raised blank centering position as illustrated in Figure 7. The blank centering spider 98 is adapted to be elevated against the action of the coiled spring 103 by means of the roller 96 when said roller rides upwardly over a cam block 106 (Figure 9) which is supported upon a shelf or extension plate 107 formed on the machine frame below the outer end of the centering table 92. The spider 98 is raised when the centering plate 92 is moved from the position shown in Figure 6 into the inclined position illustrated in Figure 7. When this movement occurs the roller 96 passes upwardly over the cam block 106 into the position illustrated in Figure 9 thereby permitting the control springs 101 to swing the outer ends of the centering dogs 100 upwardly to engage the peripheral edge of a blank on the table 55 to properly center the blank.

A mechanism is provided for swinging the blank centering table 92 from the position shown in Figure 6 into the position shown in Figure 7. This mechanism comprises a bell crank consisting of a curved arm 108 and a hooked arm 109. The bell crank 108—109 is pivotally supported on the upper surface of the table 92 and has one end of a coiled control spring 110 secured to the curved arm 108 while the other end of said coiled spring 110 is secured to a pin on the bottom surface of the centering table 92. Mounted on the stationary shaft 107 is a stop pin 111 against which the curved bell crank arm 108 is adapted to be moved to cause the bell crank 108—109 to be pivoted on the table 92 against the action of the spring 110 to permit the hooked arm 109 of the bell crank to be moved out of engagement with a stop pin 112 mounted upon the upper face of the pivoted centering table 92 and out of engagement with one of a plurality of radially disposed fingers 113 secured at spaced intervals on the peripheral edge of a rotatable control disk 114. The rotatable disk 114 is provided with a plurality of radially directed elbow arms or spokes 115, the inner ends of which are integrally connected with a hub 116 which is engaged around the lower end of a gripper supporting wheel, the hub 117 of which is keyed or otherwise secured to the upper end of the vertical shaft 88 to be rotated thereby. The gripper wheel hub 117 is provided with a plurality of recessed radially directed arms 118 disposed at right angles with respect to one another. Rigidly secured by screws or other suitable means to each of the radial arms 118 is a stationary top gripper plate 119 which is of substantially a segment shape. Pivotally mounted in each of the arms 118 is an angle bracket to one arm 120 of which a lower segment-shaped gripper plate 121 is secured. The lower gripper plate 121 is adapted to coact with the upper stationary gripper plate 119 as hereinafter more fully described. The second arm 122 of each of the pivoted gripper support brackets is directed downwardly to coact with bosses or shoes 123 formed on the outer edge of a plurality of arms 124 which are pivoted at one of their ends to the under side of the horizontal portions of the ribs or spokes 115 of the ring member 114. Pivotally mounted on the under side of the free end of each of the pivoted arms 124 is a control roller 125 which is adapted to track on the peripheral edge of a cam 126 which is integrally formed peripherally on the stationary collar 91. The pivoted arms 124 which are carried by the spokes of the rotatable ring 114 are adapted to coact with the stationary cam 126 at predetermined times so that the bosses or lugs 123 thereon will coact with the downwardly directed arms 122 of the angle brackets 120—122 to cause the arms 122 to be swung outwardly from an inclined position shown at the left hand side of Figure 8 into a substantially vertical position as shown to the right of the shaft 88 in Figure 8 so that the lower gripper plates 121 are adapted at predetermined times to be swung upwardly from an open position against the lower surface of the respective upper stationary grippers 119.

For the purpose of returning the blank centering table 92 from the inclined position shown in Figure 7 back to the straight line normal position of Figure 6, a bell crank comprising a short arm 127 and a long arm 128 is pivotally mounted on a stub shaft 129 secured upon the top of the machine frame 1. A roller 130 is rotatably mounted on the end of the short bell crank arm 127 and is adapted to coact with a plurality of shoes 131 mounted upon the rotatable ring 114 at substantially 90° apart. Pivotally connected to the end of the longer bell crank arm 128 is one end of a connecting link or bar 132, the other end of which is pivotally connected to a pin on the under side of the reciprocating blank centering table 92. It will thus be seen that when the bell crank roller 130 comes into contact with one of the shoes 131 on the rotating ring 114 that the long bell crank arm 128 is thrown away from the ring 114 thereby causing the link 132 to pull the centering table 92 from the inclined position illustrated in Figure 7 back into the normal straight line position shown in Figure 6.

For the purpose of holding the centering spider 98 in its elevated position so that the centering dogs or fingers 100 will hold a disk blank centered for a predetermined length of time a pawl 138 (Figure 9) is pivotally mounted on the under side of the centering table 92 to coact with the projecting end of the pin 97 on which the roller 96 is supported. When the centering table 92 is moved into its inclined position shown in Figure 7 the lower end of the pawl 133 is moved into engagement with a stop block 134 which is mounted upon the shelf 107. When this occurs the pawl 133 is swung out of engagement with the pin 97 thereby permitting the spring 103 to move the centering spider 98 downwardly so that the centering dogs or arms 100 are released from engagement with a centered blank.

After a dish blank has been properly centered upon the table 55 and gripped by a pair of gripper plates 119 and 121 with the points of said gripper plates positioned substantially upon opposite sides of the center of the blank the rotatable gripper mechanism carries the clamped, centered blank from the position B in Figure 1 toward the position C of Figure 1 into the field of operation of the rotatable cam blade 84 which engages a portion of the blank and rapidly folds the same underneath the lower surface of the lower gripper plate 121 to crease one margin of the blank along the radial line 135 and form a looped portion 136 which projects upwardly above the plane of the gripper plates as clearly shown in Figures 19 to 22 inclusive. The partially formed dish is now carried from position C toward the position D of Figure 1 to be provided with another radial crease with the completion of the forming of the sundae dish. As the rotatable gripper device carries a partially formed blank from the position C toward the position D of Figure 1 the looped portion 136 of the blank is brought into engagement with a stationary creasing and forming blade 137 which is provided with a rounded edge 138 and is secured upon one end of an arm 139, the other end of which is rigidly secured to the top of the machine frame. As the partially formed and creased dish blank is advanced by the rotatable device into engagement with the stationary blade 137 said blade enters the looped portion 136 and acts to fold over a portion of the dish blank against the upper surface of the upper or stationary gripper plate 119 to form a second radially directed crease 140 thereby providing a creased portion 141 (Figure 24) consisting of three overlapping segment-shaped portions of the blank. As the crease 140 is put in the blank by the stationary creasing and forming blade 137 due to the movement of the rotatable gripper device, the looped portion 136 is guided by the curved edge 138 of the blade 137 and said blank is given its completed conical form as illustrated in Figures 23 and 24. As the completed sundae dish is moved into the position D of Figure 1 the lower gripper plate 121 is automatically released and the finished sundae dish is permitted to be automatiaclly discharged.

With the formation of the dish crease 140 in a dish blank by the stationary blade 137 the travel of the rotatable gripper device causes the completed sundae dish 142 to have a sort of a rotatable movement with respect to the stationary creasing blade 137 thereby permitting the completed dish to pass out of engagement from beneath said blade 137 as it approaches positioin D of Figure 1.

With a sundae dish completely creased and formed as described, a discharge mechanism is provided for removing the finished dish from a pair of gripper plates 119—121. The automatic dish discharge mechanism comprises a pair of V-shaped arms 143, the inner ends of which are engaged in a pair of diametrically opposite lugs 144 integrally formed on opposite sides of the upper end of a sleeve 145. The sleeve 145 is rotatably engaged on a plunger rod 146, the upper end of which is curved at 147 and has secured to the end thereof a conical dish plunger 148. The lower portion of the plunger rod 146 is slidably engaged through the sleeves of a supporting bracket 149 supported on the machine frame. Also mounted on the rotatable sleeve 145 is a ring gear 150 which meshes with a large ring gear 151 formed on the outer periphery of a ring member 153 into which the upper end of a dish receiving tube 152 is adapted to be projected. Also mounted on the rotatable sleeve 145 is a beveled gear 154 which is in mesh with a beveled gear 155 secured on one end of a shaft journalled in a bearing sleeve 156 supported on the machine framework 1. A beveled gear 157 is mounted on the other end of the shaft in the bearing sleeve 156. The beveled gear 157 is in mesh with and receives a drive from a beveled gear 158 mounted on the outer end of the transverse shaft 28. It will thus be seen that a drive from the shaft 28 is transmitted to the rotatable sleeve 145 to rotate the meshing gears 150 and 151 as well as the dish discharge arms 143.

Pivotally mounted on the rotatable sleeve 145 below the dish discharge arms 143 is a reciprocating crank arm 159. Pivotally connected to the end of the crank arm 159 (Figure 10) is one end of a connecting arm 160, the other end of which is pivotally connected to the upper end of the long arm 161 of a bell crank member pivoted at 162 (Figure 14) and also having a bell crank arm 163 carrying a roller 164. The roller 164 coacts with a cam 165 which is secured on the shaft 128. Pivotally engaged on one side of the crank arm 159 is one end of a dish retaining arm or finger 166, the outer end of which is bent downwardly to afford a tip 167 (Figure 14) adapted when in its lowered position to engage the margin of the folded portion 141 of a finished sundae dish to hold said folded portion of a dish against springing apart during the discharge of a finished sundae dish. For the purpose of permitting the retaining arm 166 to be elevated and seated in a notch 168 (Figure 10) of the arm 139 to permit a finished sundae dish to pass beneath said arm 166, a cam 169 is mounted upon the top of the machine frame to one side of the crank arm 159. When the crank arm 159 is actuated to swing to the left, looking at Figure 10, the retaining arm 166 swings toward the arm 139 and passes upwardly over the cam 169 thereby causing the retaining arm 166 to swing upwardly about its pivot point into the notch 168 of the arm 139. When the retaining arm 166 is in its lowered position the tip end 167 thereof is adapted to engage the folded portion 141 of a finished sundae dish to hold the sundae dish in a proper position until one of the rotating V-shaped arms 143 engages the interior of the finished sundae dish to remove the same from the respective open grippers and deliver the same over a dish stacking attachment and below the plunger 148.

A finished sundae dish when removed from one of the pairs of gripper plates by one of the rotating discharge arms 143 is delivered into the field of operation of the vertical reciprocating conical plunger 148 which is mounted on the upper curved arm 147 of the reciprocating plunger rod 146. The plunger rod 146 has secured to the central portion thereof a collar 170 (Figure 3) to which is pivotally connected the slotted end of a lever 171 which is pivoted on a pin 172 supported on the machine frame. The pivoted lever 171 is provided with an enlarged portion 173 intermediate its ends. The enlarged portion 173 of the lever 171 is provided with a longitudinal slot 174 in which an eccentric roller 175 is engaged as clearly illustrated in Figure 12. The roller 175 is eccentrically mounted on a disk 176 secured on the outer end of the transverse stub shaft 23. It will thus be seen that rotation of the disk 176 will cause the pivoted lever 171 to be reciprocated to cause reciprocation of the plunger rod 176 and the conical plunger 148 mounted on the upper end thereof.

When the plunger 148 is moved downwardly from the position illustrated in Figure 3 said plunger is adapted to seat within a discharged finished sundae dish to push the dish downwardly through an opening 177 (Figure 16) provided in a table or plate 178 which is mounted upon a table bracket 179 secured to a horizontal bar 180 forming a part of the machine framework. Secured to the bottom face of the horizontal shelf 181 of the bracket 179 by means of screws or other suitable means are a pair of oppositely positioned segment-shaped guide segments 182 (Figure 16). The inner curved edges of the guide segments 182 project into a peripheral groove provided in the outer periphery of the dish receiving ring 153. The dish receiving ring 153 is positioned below the plate 178 and has secured to the inner face thereof a plurality of spaced tongues or lugs 183 which project inwardly toward one another and serve to prevent dishes from moving upwardly out of said ring 153 through the opening 177 of the table plate 178. The ring 153 is adapted to be rotated as hereinbefore described by means of the ring gear 151 mounted on the periphery thereof when said ring gear is rotated by the gear 150 mounted on the rotating sleeve 145.

The upper end of the dish receiving tube 152 projects into the lower end of the rotatable ring member 153. The tube 152 is adapted to receive the completed sundae dishes in nested relation, one within the other, due to the operation of the reciprocating plunger 148. The lower end of the dish receiving tube 152 is seated in a base casting 184 supported by means of a bracket 185 secured to the machine frame. Slidably projecting upwardly through an opening in the bracket 185 and through a central opening in the base casting 184 is the upper end of a slidable stem or rod 186. The upper end of the stem 186 projects into the tube 152 and has supported thereon within said tube a conical dish holder 187 for receiving the sundae dishes as they are deposited into the tube 152. The stem 186 is long enough to permit the dish holder 187 to be raised to the top of the tube when the dish forming operation commences. Secured on the lower end of the slidable stem 186 is an arm 188 which is provided with a sleeve 189 slidably engaged on a vertical shaft 190 having the upper end supported in the bracket 185 and the lower end secured in a lug or projection 191 formed on the base plate of the machine framework. Connected to the upper end of the slidable sleeve 189 is one end of a cable 192 to the other end of which a counterweight 193 is secured. The cable 192 passes over a guide pulley 194 which is rotatably supported on an upright member of the machine frame, as clearly illustrated in Figures 2 and 15.

The operation is as follows:

To operate the improved sundae dish forming machine unit a drive from the main driving shaft 2 is adapted to be transmitted to the fly-wheel 7 by means of the endless chain 4. When it is desired to start the machine the control or starting lever 12 is operated to actuate the clutch 8 to move the same into engagement with the fly-wheel 7 so that the drive from the endless chain 4 is transmitted to the auxiliary shaft 5. A stack of substantially round dish blanks are placed within the magazine 38 and between the guide posts 39 and the guide member 40 so that the dish blanks may be fed downwardly by gravity as the lowermost blanks are removed one at a time from the magazine. The drive from the auxiliary shaft 5 is transmitted to the blank feeding mechanisms through the gears 16, 17, 21 and 22 (Figure 4) and then to the chain 26 to cause rotation of the blank feed shaft 32 and the feed reels 34 supported thereon. With each revolution of the shaft 32 (Figure 13) the friction pads 35 are moved into frictional engagement with the lowermost dish blank in the magazine 38 and act to feed said lowermost blank through the discharge slot 41 and between the primary feed rollers 42 and 43. The rollers 42 and 43 are rotated from the large gear 54 which acts to rotate the pinion 53 on the shaft 52 which in turn rotates the pinion 51 and the pinions 49 and 48 mounted on the roller shafts 50 and 44 respectively (Figure 9). The rotating primary feed rollers 42 and 43 act to feed the dish blank 58 from the magazine onto the stationary table 55 beneath the guide blade 59 as illustrated in Figure 17. The advanced portion of the dish blank 58 is thus gradually fed between the secondary feed rollers 61 and 62 which receive their drive from the pinion 49 through the large gear 69 and the respective pinions 68 and 67.
At this stage in the operation the gripper wheel 117 which is rotated by the vertical shaft 88 and the meshing beveled gears 86 and 87 and the eccentrically connected disks 20 and 73 (Figure 4) advances a pair of open gripper plates 119—121 from the position E of Figure 1 toward the guide blade 59 of Figure 17. The respective gripper plates 119—121 when in position E are open, due to the fact that the corresponding control arm and its roller 125 is out of engagement with the enlarged portion of the cam 126 (Figure 7) so that the respective angle bracket 120—122 carrying the lower gripper plate 121 is permitted to swing by gravity toward the shaft 88 thus moving the lower gripper plate 121 downwardly away from its respective upper gripper plate 119 as clearly shown at the left hand portion of Figure 8. The guide blade 59 hereinbefore referred to is provided for the purpose of permitting the open gripper plates 119—121 to pass above and below said guide blade to properly guide said gripper plates above and below the advancing dish blank 58. The guide blade 59 thus prevents the advancing dish blank from accidentally becoming crumpled by improper engagement of the advancing rotatable gripper plates.

The open gripper plates having advanced into the position shown in Figure 17, the secondary feed rollers 61 and 62 continue to advance the dish blank over the table 55 into the field of operation of the automatic blank centering means. When the blank is positioned on the end portion of the table 55 between the gripper plates 119—122 which are now moved into position B of Figure 1 the centering dogs 100 are in their released or lowered positions as shown in Figures 6 and 8 below the surface of the blank centering table 55. Rotating with the gripper wheel 117 is the ring member 114 which is now positioned as illustrated in Figure 6 with the hooked arm 109 engaged with one of the radial fingers 113 of the ring member 114 and also contacting the stop pin 112. It will thus be seen that as the ring member 114 advances that the respective finger 113, acting on the hooked arm 109 will cause the centering table 92 to swing from the straight line position of Figure 6 toward the inclined position of Figure 7. With the swinging of the plate 92 as described the control roller 96 (Figures 8 and
9) rolls upwardly on the cam block 106 thereby causing the spring controlled centering spider 98 to be raised against the action of the spring 103. The raising of the spider 98 permits the spring 101 on the spider arms to swing the outer ends of the centering dogs 100 upwardly into the position illustrated in Figure 9 to engage against the periphery of the blank positioned upon the centering end of the stationary table 55. It will thus be seen that the centering dogs 100 act to properly center the blank so that the pointed ends of the gripper plates will be positioned in proper relation with the center of the advanced dish blank. As the spider control roller 96 rolls upwardly over the cam block 106 the raised pin 97 is permitted to be advanced over the hooked portion of the pivoted pawl 133 (Figure 9) which acts to hold the spider and the centering dogs thereof in an elevated position for a predetermined length of time. The blank centering table 92 continues to swing from the position shown in Figure 6 into that illustrated in Figure 7 until the curved crank arm 108 is brought into contact with the stop pin 111. When this operation takes place the control spring 110 is tensioned and the hooked arm 109 is swung outwardly from the position shown in Figure 6 into the release position shown in Figure 7 thus stopping the swinging movement of the centering table 92.

Simultaneously with the centering operation of the sundae dish blank the respective roller 125 of one of the control arms 124 is moved into a position to ride over the stationary cam 126 (Figure 7) so that the shoe 123 of said arm is moved outwardly into engagement with the lower arm 122 of the respective angle bracket 120—122 (Figure 8) so that the angle bracket is swung outwardly and upwardly thereby automatically causing the respective lower gripper plate 121 to swing upwardly to clamp the centered dish blank between a pair of the rotating gripper plates. The centered dish blank is now properly gripped by the rotating gripper device between the gripper plates in position B of Figure 1.

As the blank is centered and then gripped for further advancement through the machine the rotating ring 114 advances to bring one of the cam shoes 131 into engagement with the roller 130 on the short bell crank arm 127. When this occurs the short bell crank arm 127 is thrown outwardly away from the ring thereby causing the long bell crank arm 128 to also swing outwardly to pull the link 132 from the position shown in Figure 7 back into the position illustrated in Figure 6. When this occurs the centering table 92 is automatically pulled from its inclined position back into its normal position shown in Figure 6 thereby causing the lower end of the pivoted pawl 133 to be brought into contact with the stop block 134 which acts to cause the pawl 133 to swing out of engagement with the pin 97. When this occurs the tensioned control spring 103 acts to slide the raised centering spider 98 downwardly into its normal position so that the inner ends of the centering dogs 100 pivot on the upper ends of the post 102 to cause the outer ends of said dogs to be lowered to release the centered dish blank on the table 55.

With a dish blank gripped by a pair of gripper plates and released by the centering mechanisms as described the continuously rotating gripper wheel moves the closed grippers holding the centered blank to advance the blank from the position B of Figure 1 toward position C. The vertical gripper carrying shaft 88 and the vertical shaft 80 are both driven by the horizontal shaft 74 at different rates of speed, the gripper mechanism rotating much slower than the vertical shaft 80, which is rapidly rotated and has supported on its upper end the creaser and folding cam 84. With the advance of a centered blank from the position B toward position C the rapidly rotating cam blade 84 passes over the slightly deflected advancing blank and rapidly folds a portion of said blank beneath the lower gripping plate 121 to crease the blank radially at 135 along one edge of the lower gripper plate 121 thereby causing the remaining portion of the advancing blank to assume the looped shape 136 clearly illustrated in Figures 19 and 20. As the partially formed blank is advanced from position C toward position D of Figure 1 the looped portion 136 is carried into engagement with the stationary creasing and forming blade 137. This blade 137 enters the looped portion 136 and as the partially formed blank is advanced the stationary blade 137 folds a portion of the loop section 136 over against the top surface of the upper gripper plate 119 and at the same time produces the radial crease 140 in the blank. When the partially formed blank is brought into engagement with the stationary creaser blade 137 the respective roller 125 of the corresponding arm 124 passes off of the stationary cam 126 thereby permitting the respective pivoted angle bracket 120—122 to swing downwardly and inwardly to automatically cause the lower gripper plate 121 to swing downwardly into its open position thereby releasing the gripped portion of the advancing dish blank. As the partially formed dish moves into engagement with the creasing blade 137 the released dish pivots around the curved edge 138 of the creaser blade 137 and is gradually moved out of engagement with said blade 137 and beneath the raised tip 167 of the arm 166. The sundae dish 142 is now completed and is so positioned that the triple folded portion 141 is positioned beneath the raised tip 167, which at this time is elevated and is engaged in the notch 168 of the creaser blade arm 139. At this stage in the operation the roller 164 passes off of the enlarged portion of the cam 165 into the position illustrated in Figure 14 thereby causing the long bell crank arm 161 to actuate the connecting link 160 to swing the crank arm 159 into the position illustrated in Figure 10 thereby causing the pivoted arm 166 to slide off of the stationary cam 169 to cause the tip end 167 of said arm 166 to be lowered into engagement with the folded portion 141 of the completed sundae dish.

With the completed sundae dish having the folded portion thereof engaged by the tip end 167 of the arm 166, one of the rotating V-shaped discharge arms 143, rotatable with the sleeve 145, is swung into the formed sundae dish 142 and slides the dish off of the clamping plates into a position wherein the apex of the dish is moved over the entrance opening 177 of the stacking table 178. As this movement of the finished dish takes place the folded portion of the dish is pulled beneath the gripping tip 167 of the arm 166 as the advancing discharge arm 143 moves out of engagement with the formed sundae dish after said dish has been delivered into the entrance opening 177 in a substantially upright position directly in the field of movement of the conical plunger 148. Just at this time the eccentric roller 175 (Figure 12) on the disk 176 is advanced in the slot 174 of the pivoted lever 171 to cause said lever to swing downwardly, thereby lowering the plunger rod 146 and causing the conical plunger 148 to enter the sundae dish to push the completed dish downwardly through the opening 177. The completed sundae dish is thus pushed into the rotatable ring 153 past the projections or tongues 183 and into the upper end of the receiving tube 152. As the sundae dish is pushed through the ring 153 the edge of the dish is slightly indented while passing between the projections 183. As the dish passes the projections 183 the rim of the dish automatically opens up so that it will engage beneath the retaining fingers or lugs 183 to prevent the dish from moving or springing upwardly out through the table plate aperture 177.

When the operation first starts the conical dish holder 187 (Figure 15) is held in its uppermost position in the tube 152 by the counterweight 193 which acts to hold the shaft or stem 186 in a raised position. A dish delivered through the rotatable ring 153 into the upper end of the tube 152 is thus seated in the dish holder 187. The completed dishes are thus adapted to be automatically delivered into the open end of the tube 152 in stacked, nested relation, one within the other, upon the supporting dish holder 187, with the folded portions of the dishes staggered with respect to one another, due to the fact that the ring 153 at the upper end of the tube 152 is continuously rotating. With the dishes deposited with the folded portions thereof in staggered relation, said dishes form a straight stack, not only within the tube but when removed therefrom for delivery into a carton or the like.

It will be noted that each time a completed sundae dish is deposited in the receiving tube 152 the dish holder 187 is lowered a predetermined amount so that the stack of dishes may be increased with the counterweight 193 acting to hold the dish holder 187 resiliently against the lowermost dish thereby serving to apply a continuous pressure against all of the dishes in the tube. When the dish holder 187 reaches the bottom of the tube 152 the machine may be stopped by means of the control lever 12 and the stack of sundae dishes may be removed from the tube 152 and an empty tube substituted in place of the removed tube. By operating the control lever 12 it will be seen that the blank feeding mechanism, the centering mechanism, the forming mechanisms, and the stacking mechanisms may all be automatically stopped and started.

If at any time during the operation of the dish forming machine it becomes necessary to stop the machine, either the control lever 12 or the hand reel 13 may be operated to bring the machine to a stop. If during the operation of the machine the dish blanks become jammed or something else happens which is not discovered by the operator the automatic throw-out mechanism 14 will act to throw out the clutch and thereby stop the operation of the machine. The improved machine of this invention is adapted to automatically form sundae dishes from properly formed blanks by means of an automatic centering mechanism and by means of a rotatable gripper wheel carrying a plurality of pairs of radially directed gripper devices permitting a plurality of blanks to be carried in successive order through a circular path through the field of operation of a rapidly rotating creasing and forming blade and a stationary creasing and forming blade, after which the formed conical sundae dishes are adapted to be automatically discharged from the gripper mechanisms and then automatically delivered into a dish receiving tube in which the dishes are stacked with the folded portions thereof positioned in staggered relation to produce a straight stack of dishes which may be easily handled when removed from the holding tube.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. A sundae dish forming machine comprising a blank receiving table, a mechanism for automatically feeding dish blanks in successive order onto said table, means for automatically centering dish blanks on said table, a rotatable creasing and forming device, rotatable gripper mechanisms adapted to grip a centered blank and carry the same through the field of operation of the rotatable creasing and forming device to cause the blank to be partially creased and formed, a stationary creasing and forming means positioned in the path of advancement of the blank by said gripper mechanisms and still further adapted to cause creasing of the blank and completion of the forming thereof into a sundae dish, a dish stacking mechanism, means for automatically transferring the formed dishes from the gripper mechanism over said stacking mechanism, and reciprocating means for automatically pushing the completed dishes into said stacking mechanism.

2. In a sundae dish forming machine the combination with a driving means, of a rotatable forming mechanism, a stationary forming mechanism, a blank centering mechanism, means for automatically advancing a blank into the field of operation of said blank centering mechanism, a rotatable gripper device adapted to automatically engage a centered blank and carry the same through the field of operation of the rotatable forming mechanism and then into engagement with the stationary forming mechanism to cause automatic forming of a conical sundae dish, a stacking attachment, and means for automatically pushing the completed sundae dish from the gripping mechanism into said stacking attachment.

3. In a sundae dish forming machine the combination with a rotatable creasing and forming device, of a stationary creasing and forming device, a blank support, means for automatically centering a blank delivered onto said support, a rotatable gripper device, mechanisms for automatically operating the rotatable gripper device and said centering means to cause the rotatable gripper device to clamp a centered blank and carry the same through the field of operation of said rotatable creasing and forming device and then into engagement with the stationary creasing and forming device to automatically form a completed sundae dish having a folded portion, means for releasing the gripper device, a discharge mechanism for removing the completed dish from said gripper device, a retainer tip for holding the folded portion of the dish during the discharge thereof, a stacking attachment, and means for automatically delivering the completed dish into said stacking attachment.

4. In a dish forming machine the combination with rotatable and stationary creasing and forming blades, of a blank feed mechanism, a rotatable gripper wheel, stationary and movable gripper plates thereon adapted to engage the advanced blanks to carry the same through the fields of operation of said creasing and forming blades to cause automatic forming of sundae dishes, and means for automatically discharging the completed dishes from the machine.

5. In a dish forming machine the combination with a table, of means for automatically delivering a blank onto said table, a reciprocating centering mechanism adapted to engage a blank on said table and automatically center said blank, a rotatable gripper device adapted to automatically engage a centered blank on said table and carry the same through a circular path, a rotatable former adapted to coact with said rotatable gripper device to crease and partially form the blank, a stationary forming device positioned to coact with a partially formed advancing blank to cause the completion of the creasing and forming of said blank, a stacking attachment, a rotatable discharge mechanism adapted to engage a finished dish and deliver the same over said stacking attachment, and automatically acting means for pushing the completed dish into said stacking attachment.

6. A dish forming machine comprising a blank feeding mechanism, a table for receiving the blanks, a blank centering mechanism below said table, a rotatable blank advancing gripper device, means operable thereby for automatically causing operation of the centering mechanism to cause a blank on said table to be automatically centered as it is engaged by said gripping mechanism, a rotatable forming device coacting with the gripper device to partially crease and form an advancing blank, a stationary forming mechanism positioned in the path of the partially formed dish to coact with said gripper mechanism to cause the creasing and forming of the blank into a sundae dish, and mechanisms adapted to automatically discharge the completed sundae dish.

7. A sundae dish forming machine comprising a rotatable forming mechanism and a stationary forming mechanism, a blank centering device, means for automatically delivering a blank into the field of operation of said centering device to cause automatic centering of the blank, a rotatable gripper adapted to grip the centered blank and carry the same into the field of operation of said rotatable forming mechanism to cause the blank to be partially creased and formed and then advance the partially creased and formed blank against the stationary forming mechanism to complete the creasing and forming of the blank to form a finished sundae dish, pivoted means for engaging the folded portion of a dish, a rotatable discharge mechanism adapted to engage in the dish and move the same out of engagement with said gripper, a dish receiving attachment, and mechanisms adapted to act automatically to push the completed sundae dish into said dish receiving attachment.

8. A sundae dish forming machine comprising a table, means for successively advancing blanks over said table, a centering device for automatically centering the advanced blanks, a rotatable forming mechanism, a stationary forming mechanism, and a rotatable gripper for carrying the centered blanks through the field of operation of said rotatable forming mechanism and then into engagement with said stationary forming mechanism to cause the blanks to be automatically creased and formed into a sundae dish.

9. A sundae dish forming machine comprising a table, means for automatically advancing dish blanks onto said table, a centering mechanism, means for automatically operating said centering mechanism to cause centering of the blanks on said table, a movable forming mechanism, a stationary forming mechanism, a rotatable gripper, means for automatically operating the same to cause the gripper to grip a centered blank and carry the same through the field of operation of said rotatable forming mechanism and then into engagement with said stationary forming mechanism to cause the advancing blank to be creased and folded to form a conical sundae dish, retaining means for automatically engaging the folded portion of the completed sundae dish, a dish receiving mechanism, a rotatable discharge mechanism for removing the formed dish from said gripper device and delivering the same over said dish receiving mechanism, and reciprocating means for automatically pushing the completed sundae dish out of engagement with said retaining means and then delivering the completed dish into said dish receiving mechanism.

10. A sundae dish forming machine comprising a rotatable forming device, a stationary forming device, a table, means for automatically advancing a blank onto said table, a centering device, means for automatically operating the centering device to cause the same to center the blank on said table, a rotatable gripper, means for operating the same to cause the gripper to engage the centered blank and then carry the same through a circular path to be acted upon by said rotatable former and said stationary former to cause a blank to be automatically formed into a sundae dish, and means for automatically discharging the formed sundae dish from said gripper.

11. A sundae dish forming machine comprising a movable former, a stationary former, a blank centering mechanism, means for automatically delivering blanks to said blank centering mechanism, a rotatable member, and a plurality of pairs of coacting stationary and movable gripper plates carried by said rotatable member adapted to automatically carry a plurality of blanks in successive order through a path to be acted upon by said rotatable former and said stationary former to cause the rapid formation of sundae dishes from said blanks.

12. A sundae dish forming machine comprising a centering device, a rotatable cam blade, a stationary blade, a rotatable gripper device positioned between said centering device, said rotatable cam blade and said stationary blade, and means for automatically operating said gripper device to cause the same to successively carry a plurality of blanks from the centering device past the rotatable cam blade and past the stationary blade to cause the blanks to be creased and folded to form conical sundae dishes.

13. In a sundae dish forming machine the combination with pairs of rotatable gripper plates, of rotatable and stationary forming devices positioned to permit the gripper plates to carry a plurality of blanks in successive order past said rotatable forming device and said stationary forming device to cause the blanks to be radially creased and folded to form sundae dishes.

14. A sundae dish forming machine comprising a blank supporting table, means for automatically delivering blanks onto said table, a pivoted centering device, a rotatable wheel mechanism, a plurality of pairs of gripper plates thereon, means on said wheel for automatically causing operation of said centering device to cause blanks to be centered on said table, means on said wheel for actuating the gripper plates to cause the same to grip the centered blanks at predetermined times, a rotatable former, a stationary former, means for rotating said wheel to cause the gripper plates to carry the blanks through the field of operation of said rotatable former and into engagement with said stationary former to cause the blanks to be automatically creased and folded to form conical sundae dishes, a dish receiving attachment, rotatable discharge means for removing the completed sundae dishes from said gripper plates, and plunger means for delivering the completed sundae dishes into said dish receiving attachment.

15. In a sundae dish forming machine the combination with rotatable blank carrying segment shaped plates, of a rotatable creasing and forming blade adapted to coact with said rotatable blank carrying plates to radially crease a blank and partially form the same, and stationary means positioned to engage in the partially creased and formed blank as it is advanced by said blank carrying plates to also radially crease the blank and complete the forming of the same to form a conical sundae dish.

16. In a sundae dish forming machine the combination with a rotatable wheel, of a plurality of pairs of gripper plates on said wheel, means for rotating the wheel, a blank receiving table, means for automatically delivering blanks to said table, a centering mechanism, means for automatically operating said centering mechanism to cause the blanks on said table to be centered, mechanisms for automatically operating the gripper plates at predetermined times to cause the same to grip centered blanks and carry the same through a circular path, a rotatable former coacting with said gripper plates to partially crease and form the blanks, a stationary former adapted to complete the creasing and forming of the blanks into conical sundae dishes, a pivoted dish retaining arm adapted to engage the folded portions of the sundae dishes, a dish receiving attachment, rotatable means for engaging the completed sundae dishes and delivering the same over said stacking attachment, a plunger device, and means for automatically operating the plunger device to cause the same to push the discharged sundae dishes into said stacking attachment.

17. In a sundae dish forming machine the combination with a rotatable wheel, of a gripper plate secured to said wheel, a second gripper plate pivotally mounted on said wheel below said stationary gripper plate, a blank supporting table, means for delivering a blank thereto, mechanisms for centering the blank on said table, means for actuating the pivoted gripper plate to cause the same to grip a centered blank between the stationary gripper plate and said pivoted gripper plate, a rotatable former, means for rotating the same to cause the rotatable former to coact with the gripper plates to partially crease and form a blank, and a stationary former positioned in the path of said rotatable gripper plates to coact therewith to complete the creasing and forming of the blank to produce a conical sundae dish.

18. A sundae dish forming machine comprising a rotatable former, a stationary former, a rotatable blank carrying device for advancing blanks into a position to be operated on by said rotatable former and said stationary former to form conical sundae dishes having folded portions, a pivoted arm adapted to engage the folded portions of the sundae dishes, a rotatable discharge mechanism adapted to engage the sundae dishes and move the same out of engagement with said pivoted arm, mechanisms for operating said pivoted arm and said rotatable discharge mechanism, a sundae dish receiving attachment, and means for automatically delivering the discharged sundae dishes into said receiving attachment.

19. A sundae dish forming machine comprising a rotatable former, a stationary former, a rotatable member, a plurality of pairs of grippers mounted on said rotatable member, means for rotating the rotatable member, a blank receiving table, mechanisms for automatically feeding blanks onto said table, a reciprocating centering table below said blank receiving table, centering mechanisms on said centering table, mechanisms operated by said rotatable member for automatically actuating the centering mechanisms and said gripper mechanisms to cause blanks on said centering table to be properly centered as they are gripped by the gripper mechanisms, and a common driving device for operating all of said mechanisms to cause the rotatable member to carry the centered blanks into engagement with the rotatable former and the stationary former to cause the blanks to be automatically creased and formed to form conical sundae dishes.

20. In a sundae dish forming machine the combination with a rotatable member, of a stationary gripper thereon, a pivoted gripper thereon, means for operating the pivoted gripper to cause the same to clamp a blank between the stationary gripper and said pivoted gripper, a rotatable creasing and forming blade, means for operating said rotatable member and said rotatable forming blade to cause the rotatable member to carry the gripped blank through the field of operation of said rotatable blade to cause the blade to crease and partially form the blank, and a stationary former positioned in the path of movement of said rotatable member to permit the partially formed blank carried by said grippers to be moved into engagement with the stationary former to cause the same to crease and finish the forming of the blank into a completed conical sundae dish.

21. In a sundae dish forming machine the combination with a rotatable member, means for rotating the same, a plurality of radially directed grippers on said member adapted to carry a plurality of blanks in successive order through a circular path, a rotatable cam blade adapted to coact with the rotating grippers to radially crease the blanks and partially form the same, and a stationary blade positioned in the path of said grippers to engage in the partially formed blanks and to coact with said grippers to further crease the blanks and complete the forming of the same into conical sundae dishes.

22. In a sundae dish forming machine the combination with a rotatable gripper adapted to carry a blank through a circular path, of a rotatable former adapted to coact with said rotatable gripper to crease and fold the blank over said gripper in one direction, and stationary means adapted to coact with the rotatable gripper to finish the creasing and fold the blank over said gripper in an opposite direction to form the blank into a conical sundae dish.

23. In a sundae dish forming machine the combination with a rotatable cam creaser and former, of a pair of segment gripper plates adapted to grip a portion of a blank and carry the blank through the field of operation of said rotatable creaser and former to cause the blank to be partly creased and folded beneath the gripped portion thereof, and a stationary former positioned in the path of said gripper plates to cause the blank to be further creased and folded over the gripped portion thereof to form a conical sundae dish.

24. In a sundae dish forming machine the combination with a rotatable former and a stationary former, of a rotatable member, a stationary gripper and a pivoted gripper on said rotatable member, a blank supporting table, a centering mechanism adapted to be operated by said rotatable member to cause the blank on said table to be centered, a stationary cam, means on said rotatable member adapted to coact with said stationary cam to cause the pivoted gripper to clamp the centered blank between said stationary gripper and said pivoted gripper, mechanisms operated by said rotatable member for releasing the centering mechanism after the blank has been engaged by said grippers, a rotatable former, means for operating the rotatable member and said rotatable former to cause the grippers to carry the centered blank through the field of operation of said rotatable former to cause the blank to be partially creased and formed, a stationary former positioned in the path of said grippers adapted to coact with said grippers to still further crease the blank and complete the forming of the same to produce a conical sundae dish, and means for automatically discharging the completed sundae dish from said grippers when the pivoted gripper is released.

25. In a sundae dish forming machine the combination with a stationary blade, of a rotatable gripper adapted to grip a circular blank and carry the same in a looped form into engagement with said stationary blade to cause the stationary blade to crease and form the blank into a conical sundae dish.

26. In a sundae dish forming machine the combination with a stationary former, of a rotatable member, segment grippers thereon adapted to automatically grip a segment portion of a blank, means for rotating said rotatable member to cause the grippers to advance the blank into coacting relation with said stationary former to cause the former to crease and form the blank into a conical sundae dish, means for releasing the grippers, and a discharge mechanism adapted to remove the formed sundae dish from said grippers.

27. The combination with a sundae dish forming machine, of a rotatable member, a plurality of radially directed gripper plates rigidly secured thereon, a plurality of gripper plates pivotally mounted on said rotatable member below said stationary grippers, means for rotating said rotatable member, a plurality of arms pivotally mounted on said rotatable member, rollers on said arms, a stationary cam with which said rollers and arms are adapted to coact, and bosses on said arms adapted at predetermined times in the rotation of said rotatable member to cause automatic closing of the pivoted grippers.

28. The combination with a sundae dish forming machine, of a blank carrying mechanism comprising a shaft, means for rotating the same, a wheel member on said shaft, a plurality of gripper plates rigidly secured on said wheel member, a plurality of secondary grippers pivotally mounted on said wheel member below said stationary grippers, and mechanisms on said wheel member for automatically moving the pivoted grippers toward the stationary grippers to clamp dish blanks therebetween, said mechanisms adapted at predetermined times to also cause automatic release of said pivoted grippers to release the blanks carried thereby.

29. The combination with a sundae dish forming machine, of a shaft, means for rotating the same, a wheel member on said shaft adapted to rotate therewith, a stationary cam surrounding said shaft, a plurality of primary grippers rigidly secured radially on said wheel member, a plurality of secondary grippers below said primary grippers, supports for said secondary grippers pivotally supported on said wheel member, and a plurality of arms pivotally mounted on said wheel member for coaction with said stationary cam to cause automatic closing and opening of the secondary grippers.

30. In a sundae dish forming machine the combination with a blank support, a blank centering mechanism associated with said support, a shaft, means for rotating the shaft, a wheel member on said shaft adapted to rotate therewith, a plurality of primary grippers rigidly secured to said wheel member, control devices for said centering mechanism adapted to be actuated by said wheel member to cause the centering mechanism to automatically center a blank on said support, a plurality of brackets pivotally mounted on said wheel member, secondary grippers secured to said pivoted brackets for coaction with said primary grippers, a stationary cam, a plurality of arms pivotally mounted on said wheel member, rollers carried by said pivoted arms to coact with said stationary cam, and projections on said pivoted arms adapted to coact with said pivoted brackets at predetermined times to cause automatic closing and opening of the secondary grippers to cause the primary and secondary grippers at predetermined times to automatically grip the centered blank on said support, carry the same through a circular path and then automatically release the blank.

31. The combination with a sundae dish forming machine, of a support, means for automatically delivering a blank thereon, a centering mechanism, a pivoted support for said centering mechanism, a control device on said pivoted support for said centering mechanism, a control mechanism connected with said pivoted support, a shaft, means for rotating the same, a wheel member on said shaft, fingers on said wheel member adapted to coact with said control device to cause automatic operation of the centering mechanism to center the blank on said support and also adapted to swing the pivoted support to permit automatic release of the centering mechanism, gripper mechanisms on said rotatable member adapted to automatically engage the centered blank on said support and carry the same through a predetermined path, forming devices for automatically forming the gripped blank into a conical sundae dish, means on said wheel member for automatically releasing the formed sundae dish, discharge mechanisms for automatically removing the formed sundae dish when released, and cam shoes on said wheel member adapted to coact with said control mechanism to automatically return the pivoted support and the centering mechanism to normal position.

32. In a sundae dish forming machine the combination with a blank supporting table, means for automatically delivering a blank thereon, a reciprocating table, blank centering mechanisms thereon, a control device on said reciprocating table for controlling the operation of said centering mechanisms, a shaft, means for rotating the same, a wheel member on said shaft, projections on said wheel member adapted to coact with said control device to cause automatic operation of said centering mechanisms to center the blank on said table, a stop for coaction with said control device to move the same out of coacting relation with the projections on said wheel member, grippers on said wheel member, a stationary cam, pivoted means on said wheel member for coaction with said stationary cam to cause automatic operation of said grippers to cause the grippers to automatically grip the centered blank and carry the same through a predetermined path and then automatically release the blank, bell crank mechanisms connected with said reciprocating table to govern the operation thereof, cam shoes on said wheel member adapted to coact with said bell crank mechanism to actuate the same at predetermined times to cause the bell crank mechanism to automatically return the reciprocating table to normal position, and resilient means connected with said control device and with said reciprocating table to move the control device back into coacting engagement with the projections on said wheel member.

33. In a sundae dish forming machine the combination with a blank support, centering means associated therewith, a rotatable wheel member, control means operated thereby for governing the operation of said centering mechanism to cause the same to center a blank on said support, grippers on said wheel member, a stationary cam, and pivoted members on said wheel member for coacting with said stationary cam to cause automatic closing and opening of the grippers to permit the centered dish blank to be gripped and carried through a predetermined path and then automatically released.

34. In a sundae dish forming machine the combination with a table, means for automatically delivering a dish blank thereon, a centering mechanism for centering the dish blank on said table, a rotatable gripper device, means for operating the same, mechanisms operated by said rotatable gripper device to cause automatic operation of the centering mechanism at a predetermined time, and cam controlled mechanisms on said rotatable gripper device adapted to cause the gripper device to automatically engage the centered dish blank, carry the same through a predetermined path and then release the dish blank.

35. The combination with a sundae dish forming machine, of a table, means for automatically delivering a dish blank thereon, a centering mechanism associated with said table, a rotatable member, means for operating the same, control mechanisms operated by said rotatable member to cause automatic operation of the centering mechanism to center the blank on said table, stationary grippers on said rotatable member, pivoted grippers on said rotatable member for coaction with said stationary grippers, a stationary cam, a plurality of arms on said rotatable member coacting with said stationary cam to cause automatic operation of said pivoted grippers to cause the rotatable member and said grippers to engage the centered blank and carry the same through a predetermined path, a plurality of forming devices positioned in said path to coact with said grippers to automatically crease and form the carried blank to shape the blank into a conical sundae dish, a dish receiving mechanism, means for automatically removing the formed sundae dish when released by said grippers, and a plunger mechanism for engaging the finished sundae dish and delivering the same into said receiving mechanism.

36. In a sundae dish forming machine the combination with a table, of means for automatically delivering a blank thereon, a reciprocating table, centering mechanisms supported on said reciprocating table, a rotatable member, means for operating the same, and a plurality of control mechanisms operated by said rotatable member to cause swinging of said reciprocating table and automatic operation of said centering mechanism to center the blank on said table and also adapted to cause automatic operation of said control mechanisms to return the centering mechanisms and said reciprocating table to their normal positions.

37. In a sundae dish forming machine the combination with a blank supporting table, of a blank centering mechanism, forming means, a gripper device, and driving means for rotating the same to cause automatic operation of the centering mechanism to center a blank on said table and further adapted to cause the gripper device to grip the centered blank and carry the same through the field of operation of said forming means to cause said forming means to crease and form the blank into a conical sundae dish before the blank is released by said gripper device.

38. In a sundae dish forming machine the combination with a blank supporting table, of a reciprocating table, centering mechanisms on said reciprocating table, rotatable means for operating said reciprocating table and said centering means, gripper mechanisms on said rotatable means, and control devices on said rotatable means adapted to automatically operate said gripper mechanisms at predetermined times to cause the gripper mechanisms to engage a centered blank on said table, carry the same through a predetermined path and then automatically release the blank.

39. The combination with a sundae dish forming machine, of a blank supporting table, of a reciprocating table therebeneath, a blank centering mechanism on said reciprocating table, spring-controlled means on said reciprocating table, a rotatable member, means for operating the same to cause the rotatable member to coact with said spring-controlled means to operate said reciprocating table, cam means for causing automatic operation of said centering mechanism when the reciprocating table is moved to cause the centering mechanism to center a blank on said table, and bell crank mechanisms operated by said rotatable member to return the reciprocating table to normal position to permit release of said centering mechanism.

40. In a sundae dish forming machine the combination with a blank supporting table, a reciprocating table therebeneath, a centering mechanism on said reciprocating table, a stationary cam, a roller carried by said centering mechanism, means for swinging said reciprocating table to cause the roller to coact with said stationary cam to automatically operate the centering mechanism to cause the same to center a blank on said table, and means operated by said rotatable member for automatically causing the return of said reciprocating table to normal position to move the roller out of engagement with said stationary cam to automatically release the centering mechanism.

41. In a sundae dish forming machine the combination with a blank supporting table, of a reciprocating table therebeneath, a centering mechanism on said reciprocating table, a spring for controlling the operation of said centering mechanism, a roller carried by said centering mechanism, a stationary cam block, a rotatable member, driving means for operating the same, a spring-controlled bell crank on said reciprocating table adapted to be operated by said rotatable member to cause the reciprocating table to be moved whereby said roller is adapted to coact with said stationary cam block to cause the centering mechanism to automatically center a blank on said table, a bell crank mechanism connected with said reciprocating table, and cam means on said rotatable member adapted to coact with said bell crank mechanism to cause automatic returning of said reciprocating table and the release of said centering mechanism.

42. In a sundae dish forming machine a blank centering mechanism comprising a reciprocating table, a stationary cam therebeneath, a spring-controlled spider on said reciprocating table, spring-controlled centering dogs on said spider, posts on said reciprocating table for coaction with said pivoted dogs, a roller carried by said spider, a spring-controlled bell crank on said reciprocating table, a rotatable member, means thereon for engaging said spring-controlled bell crank to cause the reciprocating table to be swung through a predetermined path so that the roller will be brought into coacting relation with said stationary cam to cause elevation of said spider and automatic movement of said dogs into a blank centering position, a stationary stop for coaction with said spring-controlled bell crank member to cause release of said spring-controlled bell crank member out of engagement with said rotatable member, a table return mechanism connected with said reciprocating table, and cam means on said rotatable member adapted to coact with said table return mechanism to operate the same to cause the table to be returned to normal position when the spring-controlled bell crank on said reciprocating table is released.

43. The combination with a sundae dish forming machine, of a blank centering mechanism comprising a pivoted table, a spider slidably engaged thereon, a spring engaged in said spider for holding the same in its lowered position, posts on said table, a plurality of spring-controlled dogs pivotally mounted on said spider adapted to coact with said posts, said spider when in its lowered position adapted to hold the centering dogs in released position, a stationary cam below said pivoted table, a roller carried by said spider, means for swinging said pivoted table to cause the roller to coact with said stationary cam to raise the spider and permit the spring-controlled dogs to move into a blank centering position, and mechanism for automatically returning the pivoted table to normal position to move said roller out of engagement with said stationary cam to permit the spider to be lowered and the centering dogs to be released.

44. In a sundae dish forming machine the combination with a pivoted table, of a spider slidably mounted thereon, a spring for controlling the operation of said spider, a roller carried by said spider, a stationary cam, spring-controlled dogs on said spider, posts on said pivoted table coacting with said spring-controlled dogs to permit the spider when in its lowered position to hold the spring-controlled dogs in open, released position, a spring-controlled bell crank on said pivoted table, a rotatable means for engaging said spring-controlled bell crank to cause the pivoted table to swing through an arc to permit the roller on said spider to coact with said stationary cam to cause the spider to be elevated to permit the spring-controlled dogs to automatically move into a blank centering position, a pin carried by said spider, a pivoted pawl carried by said pivoted table adapted to coact with said pin to hold the spider in its elevated position, a stationary stop block, a stationary stop pin adapted to coact with said spring-controlled bell crank to move the same out of engagement with said rotatable means to stop the movement of said pivoted table, toggle mechanisms connected with said pivoted table, and cam means on said rotatable means adapted to coact with said toggle mechanisms to cause the same to automatically return the pivoted table to normal position thereby carrying the pivoted pawl into engagement with said stop block to release the pin on said spider to permit the spider to automatically return to its normal lowered position and release the centering dogs.

45. In a sundae dish forming machine the combination with a pivotally supported centering mechanism, of a spring-controlled bell crank mechanism thereon, a stationary stop, a rotatable member, means for rotating the same, projections on said rotatable member adapted to coact with said spring-controlled bell crank mechanism to carry the centering mechanism through a predetermined path until the spring-controlled bell crank mechanism is brought into contact with said stationary stop to release the bell crank mechanism from engagement with said rotatable member, a toggle mechanism connected with said centering mechanism, and cam means on said rotatable member adapted to coact with said toggle mechanism to return the centering mechanism to normal position.

46. In a sundae dish forming machine the combination with a blank supporting table, of a vertically reciprocating blank centering mechanism mounted therebeneath, and means for automatically operating said blank centering mechanism to cause the same to automatically center blanks on said table.

47. The combination with a sundae dish forming machine, of a blank supporting table, a blank centering table pivotally mounted therebeneath, a spinder vertically adjustable on said blank centering table, spring controlled centering dogs on said spider, and means for automatically operating said spider to cause the centering dogs to automatically center a blank on said blank supporting table.

48. In a sundae dish forming machine the combination with a blank supporting table, of a centering mechanism therebeneath for automatically centering a blank on said table, a gripper mechanism for automatically removing the centered blank from said table, a rotatable member for supporting said gripper mechanism, and a plurality of mechanisms operated by said rotatable member for automatically causing operation of said centering mechanism and said gripper mechanism at predetermined times.

49. In a sundae dish forming machine the combination with a blank supporting table, of a pivoted table therebeneath, a stationary stop block and a stationary cam beneath said pivoted table, a pawl movably mounted on said pivoted table, a centering mechanism on said pivoted table, a pin carried by said centering mechanism, a roller supported on said pin, means for operating said pivoted table to cause the roller to be brought into coacting relation with said stationary cam to operate the centering mechanism and move the pin into locking engagement with said pawl to hold the centering mechanism in a blank centering position, and means for returning the pivoted table to normal position to move the pawl into engagement with said stop block to automatically release the pin and at the same time release the blank centering mechanism.

50. In a sundae dish forming machine the combination with a stationary table, means for automatically delivering a blank onto said table, a blank centering mechanism, movably mounted beneath said table, a pivoted support for said blank centering mechanism, means for reciprocating said pivoted table, and mechanisms coacting with said centering mechanism when the pivoted table is operated to cause the centering mechanism to first automatically center a blank on said stationary table and then automatically release the blank after the same has been centered.

51. A sundae dish forming machine comprising a stationary table, means for automatically advancing a blank onto said stationary table, a centering mechanism, a gripper mechanism, means for rotating the gripper mechanism to cause the same to automatically operate said centering mechanism whereby the blank on said stationary table is first centered by said centering mechanism and then gripped by said gripping mechanism and carried through a predetermined path thereby, a rotatable cam blade coacting with said gripper mechanism to partially form the carried blank, and a stationary blade adapted to coact with said rotatable blade to complete the forming of the blank into a conical sundae dish.

52. In a sundae dish forming machine the combination with a rotatable member, of a stationary gripper plate projecting axially therefrom, a pivoted gripper plate on said rotatable member beneath said stationary gripper plate, a stationary cam, a pivoted roller carrying arm co-acting therewith, for automatically operating the pivoted gripper plate at a predetermined time to cause the same to engage a blank between said stationary gripper plate and said pivoted gripper plate, and forming mechanisms positioned in the path of said rotatable member to coact with said gripper plates to crease and form the carried blank into a conical sundae dish.

53. In a sundae dish forming machine the combination with a rotatable gripper adapted to carry a dish blank through a circular path, of a cam blade, and means to rotate the same in a direction opposite to that of the rotatable gripper and to coact with said rotatable gripper to crease and form the blank carried by the rotatable gripper.

54. In a sundae dish forming machine the combination with rotatable segment shaped grippers adapted to carry a dish blank through a circular path, of a rotatable cam blade adapted to rotate in a direction opposite from the direction of rotation of said rotatable grippers and to pass beneath said rotatable grippers to partially crease and form the blank carried thereby, and a stationary former positioned to permit the rotatable grippers to carry the partially formed dish blank into engagement with said stationary former to complete the creasing and forming of the blank into a conical sundae dish.

55. In a sundae dish forming machine the combination with a blank supporting table, means for automatically delivering a blank onto said table into a centering position, a centering mechanism for automatically centering the blank on said table, a guide blade supported above said table, and a rotatable gripper mechanism adapted to coact with said guide blade to permit the gripper to engage over the blank on said table.

56. In a sundae dish forming machine the combination with a stationary blank supporting table, of a rotatable gripper device, means for operating the same, and a stationary guide blade above said table positioned in the path of said rotatable gripper device to guide the rotatable gripper device into proper engagement with a blank on said table.

57. In a sundae dish forming machine the combination with a rotatable gripper, means for operating the same, of a rotatable former adapted to coact with said rotatable gripper to partially form a blank into a sundae dish, a stationary former adapted to coact with said rotatable gripper to complete the forming of the blank into a conical sundae dish, a pivoted arm, means for automatically moving the pivoted arm into raised position against said stationary former to permit the completed sundae dish to pass beneath the pivoted arm and then swing the pivoted arm into a lowered position to engage and guide the completed sundae dish, and a rotatable discharge mechanism adapted to engage the completed sundae dish to move the same out of engagement with said pivoted arm into discharge position.

58. In a sundae dish forming machine the combination with a notched stationary former, of a rotatable gripper adapted to carry a blank into engagement with said stationary former to cause the blank to be creased and formed into a sundae dish, a pivoted arm, a stationary cam, means for swinging the pivoted arm over said cam to raise the arm and move the arm into engagement with said notched stationary former to permit the finished sundae dish to pass beneath said stationary former and the raised pivoted arm, cam means for swinging the pivoted arm out of engagement with said stationary former and out of engagement with said stationary cam to permit the pivoted arm to be lowered to engage the formed sundae dish, a rotatable discharge member, a receiving tube, means for operating the rotatable discharge member to cause the same to move the sundae dish out of engagement with said pivoted arm over said receiving tube, and a reciprocating plunger device for delivering the discharged sundae dish into said receiving tube.

59. In a sundae dish forming machine the combination with a stationary former, of a rotatable gripper adapted to carry a blank into engagement with said stationary former to cause the same to crease and form the blank into a sundae dish, a pivoted arm, and means for operating the same to cause the arm to engage the completed dish as it is being discharged from the machine.

60. The combination with a sundae dish forming machine, of a dish receiving tube, a reciprocating plunger, a pivoted arm for engaging the sundae dishes as they are completed, and a rotatable discharge mechanism adapted to engage in the sundae dishes to move the same out of engagement with said pivoted arm and over said receiving tube to permit the reciprocating plunger to deliver the sundae dishes into said tube.

61. In a sundae dish forming machine the combination with a plurality of creasing and forming mechanisms, of a rotatable member, and a plurality of pairs of radially projecting segment shaped blank gripping plates on said rotatable member adapted to carry a plurality of blanks in successive order to said forming mechanisms to cause the blanks to be creased, folded, and formed to form conical sundae dishes.

62. In a sundae dish forming machine the combination with a blank centering device, of a rotatable blank former, of a stationary former, and a pair of cam controlled segment shaped plates for automatically engaging and carrying a centered blank from said centering mechanism into the field of operation of said rotatable former and then into engagement with the stationary former to cause the blank to be formed into a conical sundae dish.

63. In a sundae dish forming machine the combination with an automatic blank centering device, a rotatable cam blade, a stationary blade, and a rotatable gripper adapted to carry a plurality of dish blanks in spaced relation in consecutive order from said centering mechanism into engagement with the rotatable cam blade and said stationary blade to automatically crease and form the blanks into conical sundae dishes.

64. In a dish forming machine the combination with a vertically reciprocating blank centering mechanism, of rotatable and stationary creasing and forming blades, and means adapted to engage a centered dish blank and carry the same through the fields of operation of said creasing and forming blades to cause the blank to be automatically formed into a sundae dish.

65. A sundae dish forming machine comprising a table, means for centering a blank thereon, of a rotatable forming mechanism, and a rotatable gripper for engaging and carrying the centered blank through the field of operation of said rotatable forming mechanism to cause the blank to be automatically formed into a sundae dish.

66. In a dish forming machine the combination with a rotatable cam blade, of a stationary forming blade, and movable segment gripper plates for carrying a blank between said movable cam blade and said stationary forming blade to cause the blank to be formed into a cup.

67. A sundae dish forming machine comprising a stationary table, a pivoted table mounted therebelow, centering mechanisms on said pivoted table, means for raising and lowering said centering mechanisms to cause the same to center a blank on said stationary table, a plurality of creasing and forming mechanisms, and rotatable means for removing the centered blank from said stationary table and carrying said blank to said creasing and forming mechanisms to cause the blank to be automatically creased and shaped to form a dish.

68. In a dish forming machine the combination with a blank supporting table, of a second table pivotally mounted therebelow, a spider on said second table, blank centering means on said spider, and means for reciprocating said spider to cause the blank centering means to automatically center a blank on said blank supporting table.

69. In a dish forming machine the combination with a blank supporting table, of a blank centering mechanism, and vertical reciprocating supporting means for said blank centering mechanism to cause actuation thereof and centering of blanks on said blank supporting table.

70. The combination with a segment shaped gripper adapted to grip a segment of a circular blank, of movable and stationary formers, and means for operating the movable former and said segment shaped gripper to cause three segment shaped portions of the blanks to be superimposed one on the other to cause the remaining portion of the blank to assume a conical form.

71. In a dish forming machine of the class described the combination with a plurality of formers, of movable segment gripper plates co-acting with the formers to cause a blank to be folded in opposite directions about the gripped segment thereof to cause the blank to assume a conical shape.

In testimony whereof I have hereunto subscribed by name.

CESARE BARBIERI.